(12) United States Patent
Nomura et al.

(10) Patent No.: US 11,687,239 B2
(45) Date of Patent: *Jun. 27, 2023

(54) FILE STORAGE SYSTEM AND METHOD FOR MANAGING FILE STORAGE SYSTEM

(71) Applicant: HITACHI, LTD., Tokyo (JP)

(72) Inventors: Shimpei Nomura, Tokyo (JP); Mitsuo Hayasaka, Tokyo (JP); Masanori Takata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,883

(22) Filed: Mar. 24, 2022

(65) Prior Publication Data

US 2022/0214811 A1 Jul. 7, 2022

Related U.S. Application Data

(63) Continuation of application No. 17/020,111, filed on Sep. 14, 2020, now Pat. No. 11,294,567.

(30) Foreign Application Priority Data

Mar. 26, 2020 (JP) .................................. 2020-055648

(51) Int. Cl.
*G06F 3/06* (2006.01)

(52) U.S. Cl.
CPC ............ *G06F 3/0604* (2013.01); *G06F 3/067* (2013.01); *G06F 3/0667* (2013.01)

(58) Field of Classification Search
CPC ....... G06F 3/0667; G06F 3/0604; G06F 3/067
See application file for complete search history.

(56) References Cited

U.S. PATENT DOCUMENTS

| | | | | |
|---|---|---|---|---|
| 11,240,302 B1 * | 2/2022 | Callau | ................... | G06F 3/0604 |
| 2002/0145957 A1 * | 10/2002 | Han | ..................... | G11B 27/322 |
| | | | | 369/47.12 |

(Continued)

FOREIGN PATENT DOCUMENTS

| | | |
|---|---|---|
| JP | 2013524358 A | 6/2013 |
| JP | 2016527618 A | 9/2016 |
| WO | 2015049747 A1 | 4/2015 |

OTHER PUBLICATIONS

Office Action dated Jan. 4, 2022 in corresponding JP patent application No. JP2020-055648, 8 pages.

*Primary Examiner* — Mark A Giardino, Jr.
(74) *Attorney, Agent, or Firm* — Procopio, Cory, Hargreaves & Savitch LLP

(57) ABSTRACT

A file storage system configured to use a second storage system includes a first file system provided to an application, a first storage system in which a file is stored by the first file system, a processor, state management information storing a state of the file, a state information management unit that manages the state management information, and a file virtualization unit that manages files stored in the first storage system and the second storage system. The processor performs a calling process of the first file system based on an operation request of the file from the application. The first file system processes the operation request of the file. The state information management unit performs a state management information update process of the file based on input information with respect to the first file system related to the operation request, or an operation content.

10 Claims, 21 Drawing Sheets

(56) References Cited

U.S. PATENT DOCUMENTS

| | | | |
|---|---|---|---|
| 2012/0005193 A1* | 1/2012 | Nemoto | G06F 9/5072 |
| | | | 707/E17.014 |
| 2012/0072397 A1 | 3/2012 | Esaka | |
| 2013/0185509 A1 | 7/2013 | Golosovker et al. | |
| 2014/0101115 A1 | 4/2014 | Ko et al. | |
| 2014/0136485 A1 | 5/2014 | Miyoshi et al. | |
| 2015/0193464 A1* | 7/2015 | Kwon | G06F 16/1815 |
| | | | 707/648 |
| 2015/0213032 A1 | 7/2015 | Powell et al. | |
| 2016/0006829 A1 | 1/2016 | Ishii et al. | |
| 2016/0210306 A1* | 7/2016 | Kumarasamy | G06F 16/178 |
| 2020/0265023 A1* | 8/2020 | Tomar | G06F 16/185 |

* cited by examiner

| 3101 API NAME | 3102 ARGUMENT | 3103 RETURN VALUE | 3104 TYPE | 3105 inode # | 3106 MANAGEMENT INFORMATION FILE HANDLER | 3107 PARENT inode# | 3108 EXECUTION STATE | 3109 TIME STAMP |
|---|---|---|---|---|---|---|---|---|
| write | fd=1, buf=0xXXXXXXX, nbytes=20 | N.A. | FILE | 1001 | 0x11111111 | - | START | |
| write | fd=1, buf=0xXXXXXXX, nbytes=20 | 0 | FILE | 1001 | 0x11111111 | - | COMPLETE | |

FIG. 9

| inode# | TYPE | MANAGEMENT INFORMATION FILE HANDLER | PRESENCE/ABSENCE OF Dirty SECTION | PRESENCE/ABSENCE OF NON-Stub SECTION | DELETION FLAG |
|---|---|---|---|---|---|
| 101 | DIRECTORY | 0x01010101 | PRESENT | ABSENT | False |
| 1001 | FILE | 0x11111111 | PRESENT | PRESENT | False |
| 1002 | FILE | 0x12121212 | ABSENT | PRESENT | False |

3200, 3201, 3202, 3203, 3204, 3205, 3206

FILE STORAGE SYSTEM AND METHOD FOR MANAGING FILE STORAGE SYSTEM

BACKGROUND OF THE INVENTION

1. Field of the Invention

The present invention relates to a file storage system and a method for managing a file storage system.

2. Description of the Related Art

The data amount of digital data, especially file data, has rapidly increased. A network attached storage (NAS) is a storage device suitable for sharing of the file data among multiple computers via a network. Nowadays, most of file data storages use NAS devices.

Digital data including a data file, for example, needs to be stored for a long period of time for various purposes in order to meet various legal requirements. A content addressed storage (CAS) provides a solution for long-term data archiving by guaranteeing data immutability. In general, active data is saved in a NAS device as long as being used, and then, migrated to a CAS device for the purpose of archiving.

There is known a system that arranges a CAS device in a data center, arranges a NAS device at each location (for example, each operation division of a company), connects the CAS device and the NAS device via a communication network such as a wide area network (WAN), and performs centralized management of data on the CAS device.

A storage system that manages a file data storage provides a file system to a client operating a file, and further, backs up the file stored in the NAS device to the CAS device as appropriate. Backup functions provided by the storage system include a function of detecting a file created/updated in the NAS device and asynchronously migrating the detected file to the CAS device, a stubbing function of deleting a file that is not accessed by the client from the NAS device, and a restoration function that acquires a file from the CAS device when the file is referred to again by the client. Hereinafter, the migration function, the stubbing function, and the restoration function provided by the storage system are collectively referred to as a file virtualization function in the present specification.

A background art in this technical field includes JP 2013-524358 A (Patent Literature 1). This publication discloses a method for holding log information of file operation history in a file system, identifying target data of a file virtualization function based on the log information, and determining whether a file needs to be backed up and can be stubbed.

SUMMARY OF THE INVENTION

A program for constructing a file system in a storage system is provided by open source software (OSS) in some cases. The version of OSS is upgraded relatively often, and the timing of the version upgrade is irregular. Therefore, it is necessary to update a file virtualization function with each version upgrade of OSS in order to continuously provide the file virtualization function to the storage system. The labor and effort required for such an update are enormous.

The invention has been made in view of the above problems, and provides a file storage system and a method for managing a file storage system capable of providing a file virtualization function without being affected by a version upgrade of a file system.

In order to solve the above problems, a file storage system according to one aspect of the invention is a file storage system capable of using a second storage system, the file storage system including: a first file system provided to an application; a first storage system in which a file is stored by the first file system; a processor; state management information storing a state of the file; a state information management unit that manages the state management information; and a file virtualization unit that manages files stored in the first storage system and the second storage system. The processor performs a calling process of the first file system based on an operation request of the file from the application. The first file system processes the operation request of the file. The state information management unit performs a state management information update process of the file based on input information with respect to the first file system related to the operation request, or an operation content. The file virtualization unit performs a management process of the file between the first storage system and the second storage system based on the state management information.

According to the invention, it is possible to realize the file storage system and the method for managing the file storage system capable of providing the file virtualization function without being affected by the version upgrade of the file system.

BRIEF DESCRIPTION OF THE DRAWINGS

FIG. 8 is a view illustrating an example of a log file of the file storage system according to the embodiment;

FIG. 9 is a view illustrating an example of a database of the file storage system according to the embodiment;

DESCRIPTION OF THE PREFERRED EMBODIMENTS

Figure 1:
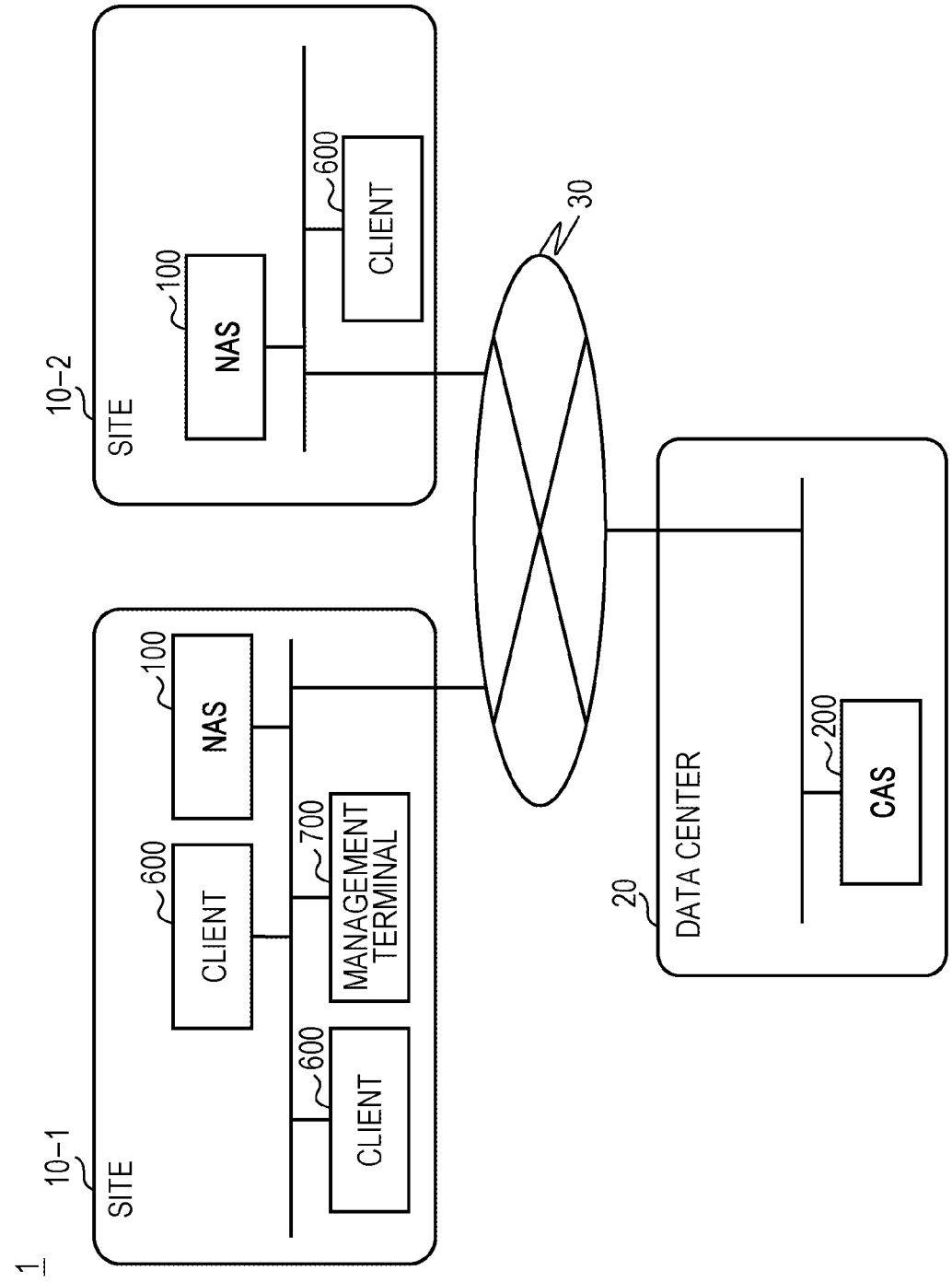
FIG. 1 is a diagram illustrating a hardware configuration of a file storage system according to an embodiment.

Hereinafter, an embodiment of the invention will be described with reference to the drawings. The following description and drawings are examples given to describe the invention, and are appropriately omitted and simplified for clarification of the description. The invention can be implemented in various other forms. Each component may be singular or plural unless specifically limited.

Incidentally, the same reference signs will be attached to portions having the same function in the entire drawing for describing the embodiment, and the repetitive description thereof will be omitted.

Positions, sizes, shapes, ranges, and the like of the respective components illustrated in the drawings do not always indicate actual positions, sizes, shapes, ranges and the like in order to facilitate understanding of the invention. Therefore, the invention is not necessarily limited to the positions, sizes, shapes, ranges, and the like disclosed in the drawings.

In the following description, various kinds of information will be sometimes described with expressions such as "table", "list", and "queue", but the various kinds of information may be expressed with a data structure other than these expressions. In order to indicate that the information is independent of the data structure, "XX table", "XX list", and the like will be sometimes called "XX information". When describing identification information, expressions such as "identification information", "identifier", "name", "ID", and "number" will be used, but these expressions can be replaced with each other.

In the following description, a configuration of each table is an example, one table may be divided into two or more tables, or all or some of two or more tables may be one table.

When there are a plurality of components having the same or similar functions, the same reference sign will be sometimes described with different subscripts. When it is unnecessary to distinguish between these plural components, however, the subscripts will be sometimes omitted in the description.

In the following description, processing performed by executing a program will be sometimes described, but the subject of the processing may be a processor since the program is executed by the processor (for example, a CPU or a GPU) to perform the prescribed processing appropriately using a storage resource (for example, a memory) and/or an interface device (for example, a communication port). Similarly, the subject of the processing performed by executing the program may be a controller, a device, a system, a computer, or a node having the processor. It suffices that the subject of the processing performed by executing the program is an arithmetic unit, and the subject may include a dedicated circuit (for example, an FPGA or an ASIC) for performing specific processing.

In the following description, a "processor (unit)" represents one or more processors. The at least one processor is typically a microprocessor such as a central processing unit (CPU), but may be another type of processor such as a graphics processing unit (GPU). The at least one processor may be a single-core or multi-core processor.

In addition, the at least one processor may be a processor in a broad sense such as a hardware circuit that performs some or all of processes (for example, a field-programmable gate array (FPGA) or an application specific integrated circuit (ASIC)).

In the following description, an "interface (unit)" may be one or more interfaces. The one or more interfaces may be one or more homogeneous communication interface devices (for example, one or more network interface cards (NICs)), or may be two or more heterogeneous communication interface devices (for example, NIC and a host bus adapter (HBA)).

In the following description, a "memory unit" represents one or more memories, and may typically be a main storage device. At least one memory in the memory unit may be a volatile memory or a nonvolatile memory.

The program may be installed on a device such as a computer from a program source. The program source may be, for example, a program distribution server or a computer-readable storage medium. When the program source is the program distribution server, the program distribution server may include a processor and a storage resource storing a distribution target program, and the processor of the program distribution server may distribute the distribution target program to another computer. In the following description, two or more programs may be realized as one program, or one program may be realized as two or more programs.

In the present disclosure, the storage device includes one storage drive such as one hard disk drive (HDD) or solid state drive (SSD), a RAID device including a plurality of storage drives, and a plurality of RAID devices. When the drive is the HDD, a serial attached SCSI (SAS) HDD or a nearline SAS (NL-SAS) HDD, for example, may be included.

FIRST EMBODIMENT

Hereinafter, an embodiment of the invention will be described with reference to the drawings.

FIG. 1 is a diagram illustrating a hardware configuration of a file storage system according to an embodiment.

A file storage system 1 according to the embodiment has sites 10-1 and 10-2 and a data center 20, and the sites 10-1 and 10-2 and the data center 20 are connected via a network 30 that is a wide area network (WAN). Although the two sites 10-1 and 10-2 are illustrated in FIG. 1, the number of sites is not particularly limited in the present embodiment.

The site 10-1 has a NAS 100, a client 600 and a management terminal 700, and these NAS 100, client 600, and management terminal 700 are connected to each other via a local area network (LAN).

A specific configuration of the NAS 100 will be described later. The client 600 is an information processing device such as a computer capable of performing various kinds of information processing, and performs various file operations such as storing a file in the NAS 100 and performing a file read/write process. The management terminal 700 manages the NAS 100 and issues various operation instructions to the NAS 100 when an abnormality occurs in the NAS 100.

The site 10-2 also has the NAS 100 and the client 600. Note that the hardware configurations of the sites 10-1 and 10-2 illustrated in FIG. 1 are merely examples, and there is no limit to the number of sites and other hardware configurations as long as each of the sites includes at least one NAS 100 and one client 600.

The data center 20 has a CAS 200. The CAS 200 functions as a backup destination of a file stored in the NAS 100 of the site 10-1 or 10-2.

Figure 2:
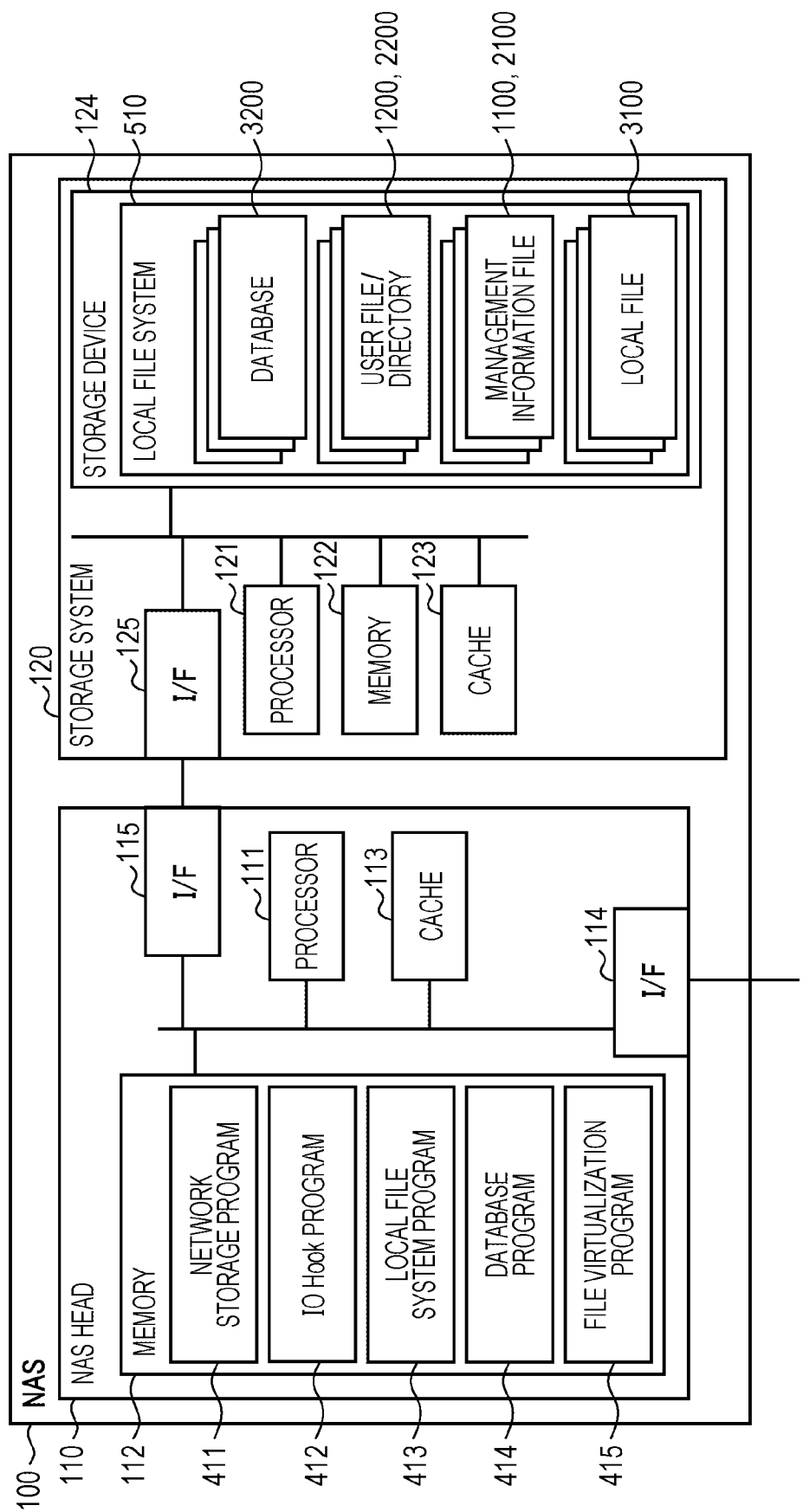
FIG. 2 is a diagram illustrating an example of a schematic configuration of a NAS of the file storage system according to the embodiment.

FIG. 2 is a diagram illustrating an example of a schematic configuration of the NAS 100 of the file storage system 1 according to the embodiment.

The NAS 100 has a NAS head 110 as a controller and a storage system 120.

The NAS head 110 includes: a processor 111 that controls the entire operation of the NAS head 110 and the NAS 100; a memory 112 that temporarily stores a program and data used for the operation control of the processor 111; a cache 113 that temporarily stores data to be written from the client 600 and data read from the storage system 120; an interface (I/F) 114 that performs communication with the other client 600, and the like in the sites 10-1 and 10-2; and an interface (I/F) 115 that performs communication with the storage system 120.

The storage system 120 also includes: a processor 121 that controls the operation of the storage system 120; a memory 122 that temporarily stores a program and data used for the operation control of the processor 121; a cache 123 that temporarily stores data to be written from the NAS head 110 and data read from a storage device 124; the storage device 124 that stores various files; and an interface (I/F) 125 that performs communication with the NAS head 110.

The memory 112 stores a network storage program 411, an IO Hook program 412, a local file system program 413, a database program 414, and a file virtualization program 415.

The network storage program 411 receives various requests from the client 600 and the like, and processes protocols included in these requests.

The IO Hook program 412 is a program that performs IO Hook processing, which is a feature of the present embodiment to be described later, and monitors a system call issued by the network storage program 411, and replaces a library called by a protocol process when the system call is called. Further, the IO Hook program 412 records a log file 3100. Details of an operation of the IO Hook program 412 will be described later.

The local file system program 413 provides a file system to the client 600 and the like. The database program 414 manages a database 3200.

The file virtualization program 415 monitors the log file 3100 and performs migration, stubbing, or restoration of a file in the storage device 124.

The storage device 124 stores the database 3200, a user file 1200, a directory 2200, management information files 1100 and 2100, and the log file 3100, and these files are managed by a local file system 510 constructed by the local file system program 413.

Figure 3:
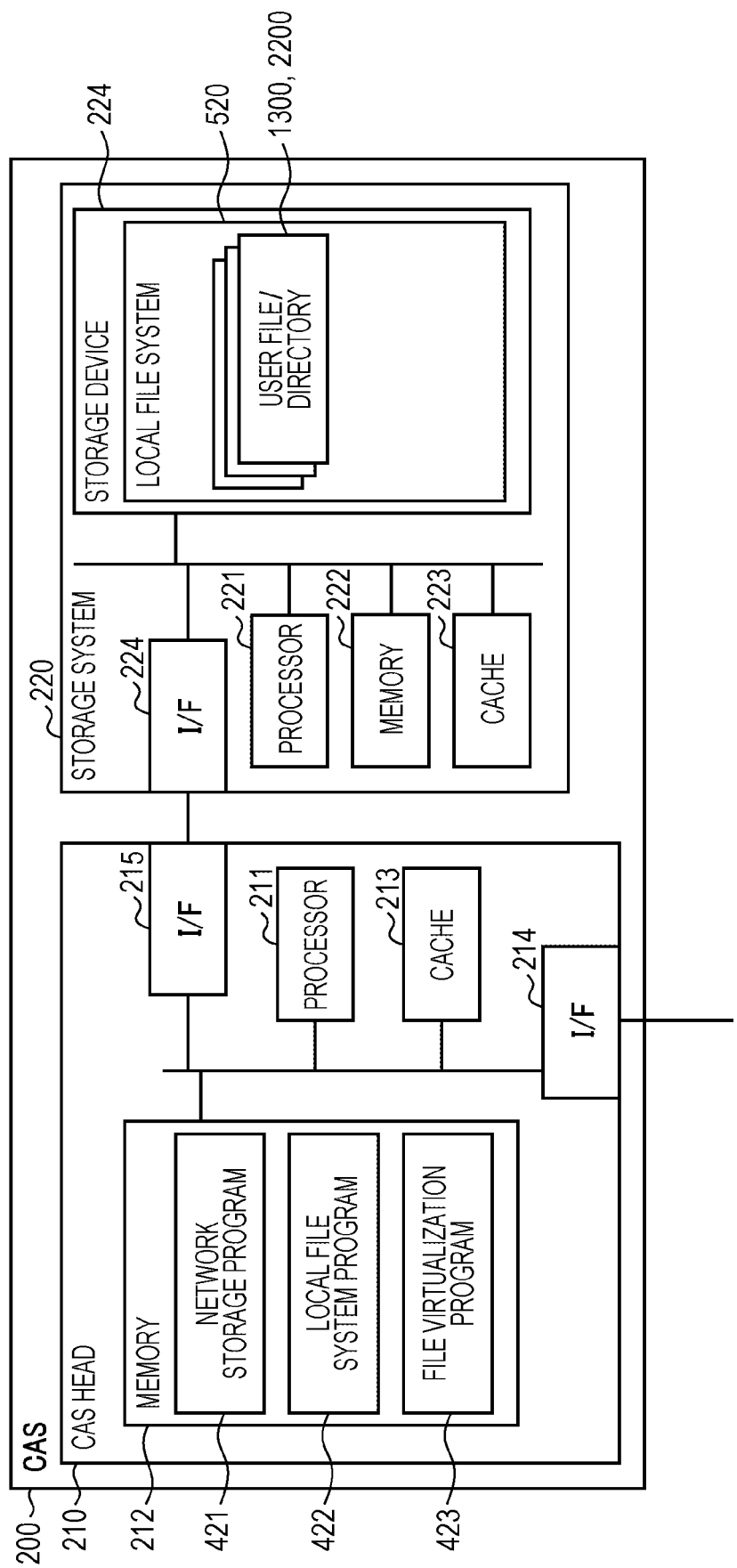
FIG. 3 is a diagram illustrating an example of a schematic configuration of a CAS of the file storage system according to the embodiment.

FIG. 3 is a diagram illustrating an example of a schematic configuration of the CAS 200 of the file storage system 1 according to the embodiment.

The CAS 200 has a CAS head 210 as a controller and a storage system 220.

The CAS head 210 includes: a processor 211 that controls the entire operation of the CAS head 210 and the CAS 200; a memory 212 that temporarily stores a program and data used for the operation control of the processor 211; a cache 213 that temporarily stores data to be written from the NAS 100 and data read from the storage system 220; an interface (I/F) 214 that performs communication with the sites 10-1 and 10-2; and an interface (I/F) 215 that performs communication with the storage system 220.

The storage system 220 also includes: a processor 221 that controls the operation of the storage system 220; a memory 222 that temporarily stores a program and data used for the operation control of the processor 221; a cache 223 that temporarily stores data to be written from the CAS head 210 and data read from the storage device 224; and an interface (I/F) 225 that performs communication with the storage device 224 in which various files are stored and the CAS head 210.

The memory 212 stores a network storage program 421, a local file system program 422, and a file virtualization program 423.

The network storage program 421 receives various requests from the NAS 100 and processes protocols included in these requests.

The local file system program 422 provides a file system to the NAS 100. Note that the file system program to be used is not limited to the local file system program 422, and a distributed file system may be used.

The file virtualization program 423 cooperates with the file virtualization program 415 of the NAS head 110 to perform migration, stubbing, or restoration of a file in the storage device 124 of the NAS 100.

The user file 1200 and the directory 2200 are stored in the storage device 224, and these files are managed by a local file system 520 constructed by the local file system program 422.

Figure 4:
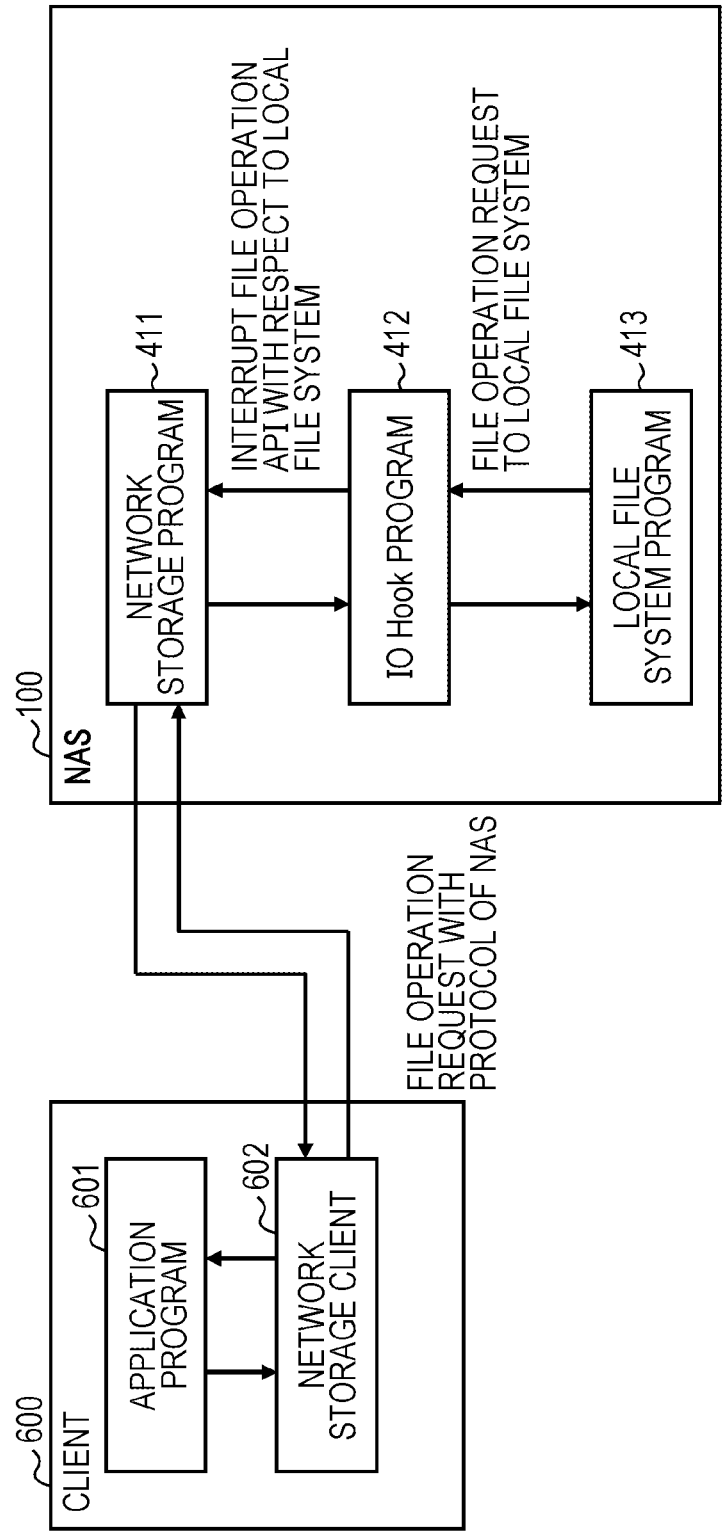
FIG. 4 is a view for describing a function of an IO Hook program of the file storage system according to the embodiment.

FIG. 4 is a view for describing a function of the IO Hook program 412 of the file storage system 1 according to the embodiment.

The client 600 has an application program 601 and a network storage client 602. The application 601 includes, for example, any software for input/output of a file such as Excel (registered trademark) and Word (registered trademark). The network file system software 602 is software for communication with the network file system program 411 of the NAS 100 in response to a request from the application program 601, and requests a file operation to the NAS 100 with the protocol of the NAS 100. In response to this request, the network storage program 411 performs a file operation on the local file system 510 provided by the local file system program 413.

The IO Hook program 412 monitors this system call issued by the network storage program 411, interrupts an API of the file operation on the local file system 510 when the network storage program 411 issues the system call, performs an update process of file virtualization management information, and further, outputs a log. Note that the object to be interrupted is not limited to the system call, and may be a unique API provided by the local file system 510, for example.

Figure 5:
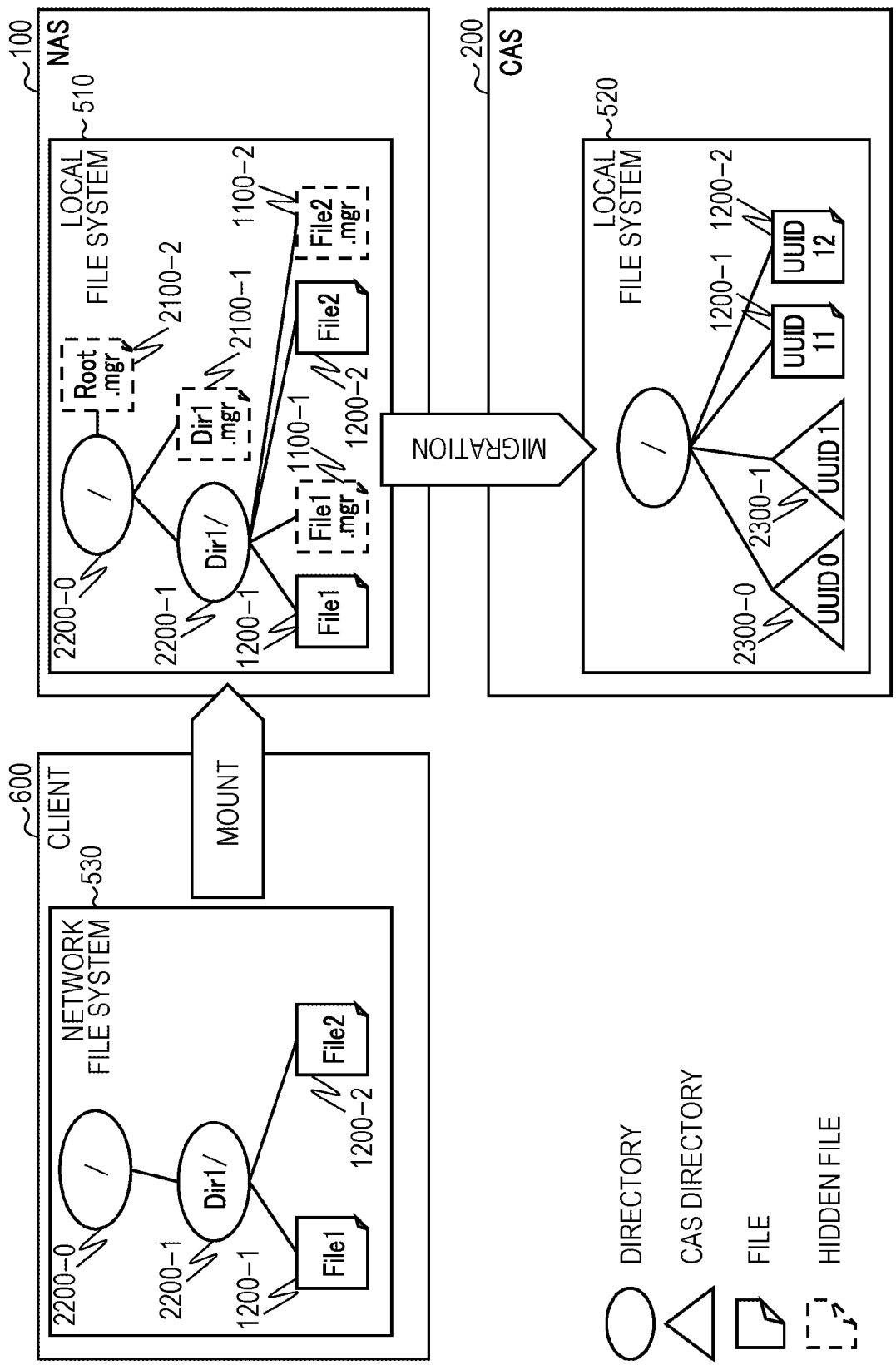
FIG. 5 is a view for describing a file system provided by the file storage system according to the embodiment.

FIG. 5 is a view for describing a file system provided by the file storage system 1 according to the embodiment.

As described already, the local file system 510 is constructed in (the storage system 120 of) the NAS 100, and the local file system 510 has a root directory 2200-0 and a directory 2200-1, for example. The directories 2200-0 and 2200-1 have management information files 2100-1 and 2100-2, respectively. The directory 2200-1 stores files 1200-1 and 1200-2, for example. In addition, the directory 2200-1 stores management information files 1100-1 and 1100-2 of these files 1200-1 and 1200-2.

When the client 600 is mounted on the NAS 100, a network file system 530 having the root directory 2200-0, the directory 2200-1, and the files 1200-1, 1200-2 is realized, and the client 600 can perform various file operations via this network file system 530. However, the management information file of the local file system 510 does not appear on the network file system 530 and is not operable since the IO Hook program 412 filters the information.

The local file system 520 is also constructed in the CAS 200. The local file system 520 does not have a hierarchical structure, and all directories 2300-0 and 2300-1 and files 1200-1 and 1200-2 are arranged under a root directory. In the CAS 200, the directories 2300-0 and 2300-1 and the files 1200-1 and 1200-2 are uniquely identified using a universally unique identifier (UUID).

Figure 6:
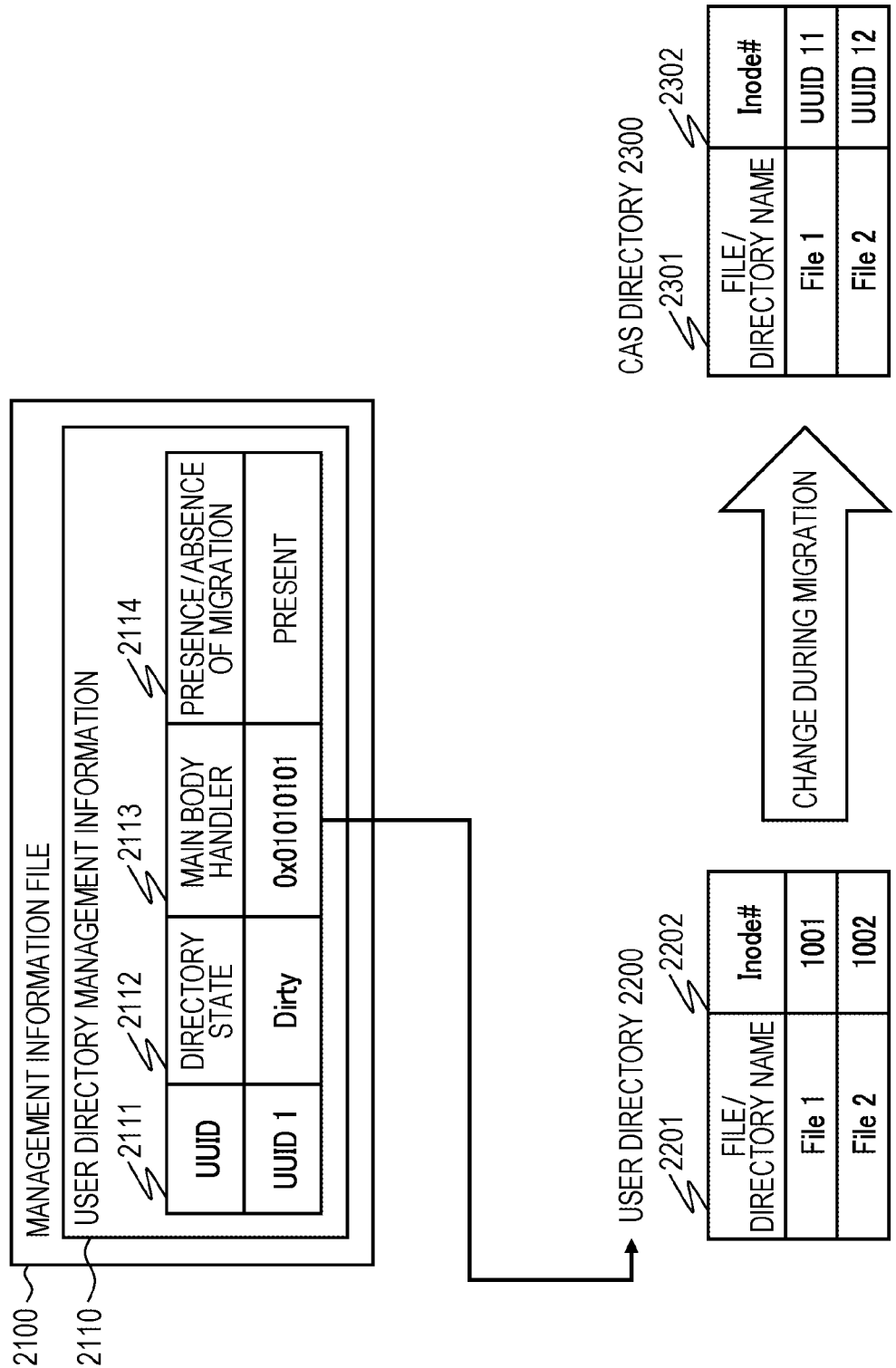
FIG. 6 is a view illustrating an example of a management information file of the file storage system according to the embodiment.

FIG. 6 is a view illustrating an example of a management information file 2100 of the file storage system 1 according to the first embodiment.

The management information file 2100 has user directory management information 2110. The user directory management information 2110 has an entry for each UUID. The respective entries are a UUID 2111 assigned to the user directory 2200, a directory state 2112 of the user directory 2200, a main body handler 2113 of the user directory 2200, and presence/absence of migration 2114.

The directory state 2112 is a value indicating whether this user directory 2200 has been updated after the previous backup, and Dirty is a value indicating that the file has been updated. The main body handler 2113 is a value that uniquely identifies the user directory 2200, and is a value that can be used to specify the user directory 2200 as an operation target in a system call. As the main body handler 2113, a value that does not change between generation and deletion of the user directory 2200 is used. The presence/absence of migration 2114 is a value indicating whether this user directory 2200 has been backed up even once.

The user directory 2200 has a file/directory name 2201 and an Inode number (#) 2202. The example illustrated in FIG. 6 is the directory (dir1) 2200-1 in FIG. 5, and two files (File 1 and File 2) are stored in this directory 2200-1. The Inode number 2202 is an Inode number uniquely assigned to each of the files (File 1 and File 2).

The CAS directory 2300 has a file/directory name 2301 and an Inode number (#) 2302. The file/directory name 2301 is the same as the file/directory name 2201 of the user directory 2200, but the Inode number 2302 is rewritten to the UUID during migration from the NAS 100 to the CAS 200. This is because the Inode number is uniquely defined only in the NAS 100, and it is necessary to issue a UUID uniquely defined in the CAS 200 during migration.

Figure 7:
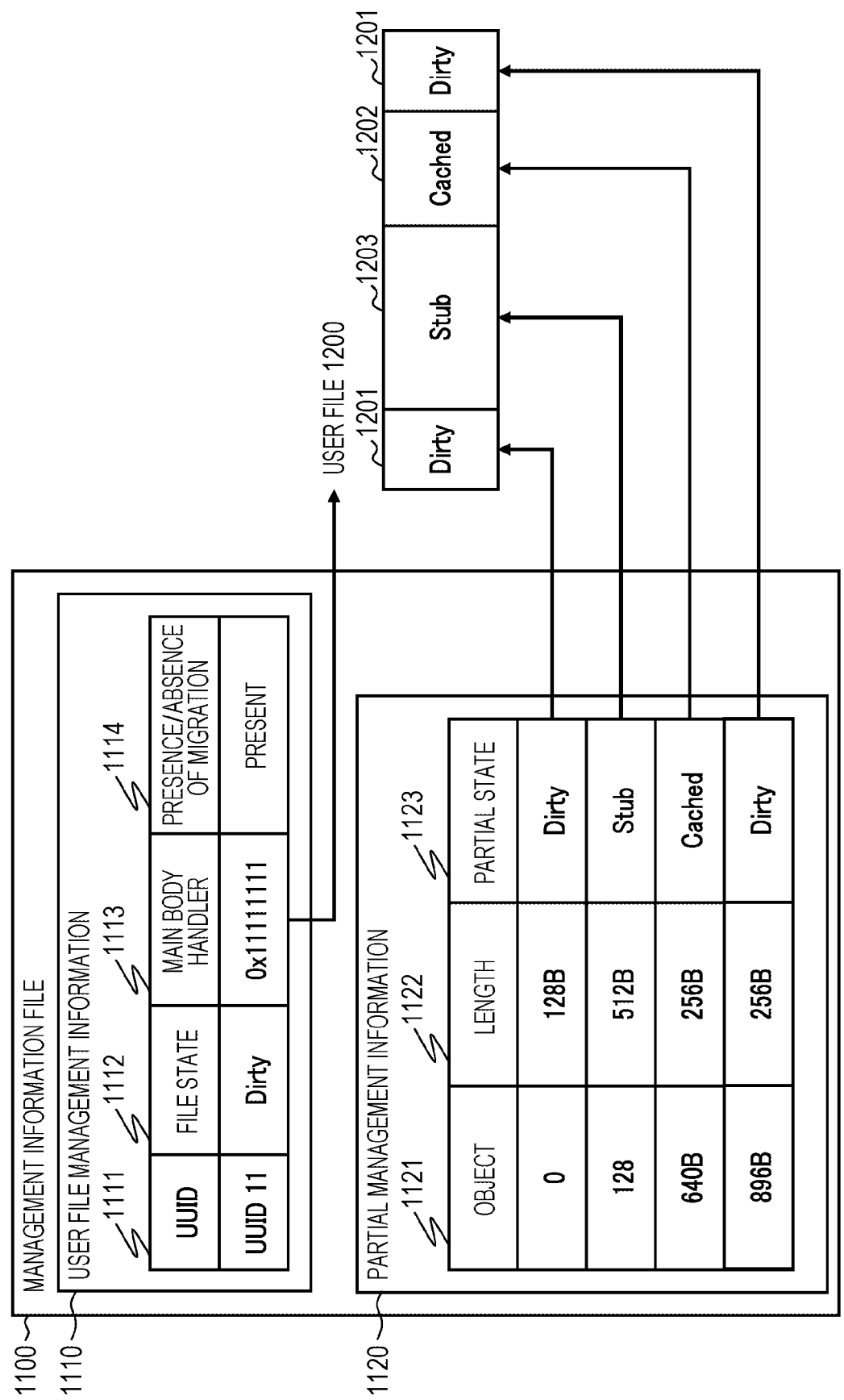
FIG. 7 is a view illustrating another example of the management information file of the file storage system according to the embodiment.

FIG. 7 is a view illustrating another example of the management information file 1100 of the file storage system 1 according to the embodiment.

The management information file 1100 has user file management information 1110 and partial management information 1120.

The user file management information 1110 has an entry for each UUID. The respective entries are a UUID 1111 assigned to the user file 1200, a file state 1112 of the user file 1200, a main body handler 1113 of the user file 1200, and presence/absence of migration 1114.

The partial management information 1120 is created for each user file 1200. The partial management information 1120 has an offset 1121, a length 1122, and a partial state 1123. The offset 1121 indicates a start position of an update process when the user file 1200 is partially updated, the length 1122 indicates any length of data that has been updated from the position of the offset 1121, and the partial state 1123 indicates what kind of update process has been performed. Her, Dirty 1201 indicates that an update has been performed since the previous backup processing, Stub 2203 indicates that deletion is performed locally (that is, from the NAS 100) after the backup processing, and Cached 2202 indicates that data is locally present and backup is also present.

FIG. 8 is a view illustrating an example of the log file 3100 of the file storage system 1 according to the embodiment.

The log file 3100 has an API name 3101, an argument 3102, a return value 3103, a type 3104, an Inode number 3105, a management information file handler 3106, a parent Inode number 3107, an execution state 3108, and a time stamp 3109. Each row of the log file 3100 is created every time there is a system call from the client 600 to the NAS 100.

The API name 3101 indicates a type of system call, and stores values of write, read, open, and close. The argument 3102 is an argument of the system call and has a file descriptor, a file operation start position, and a data size. The return value 3103 is a value returned from the local file system 510 as a result of the system call, and N. A. indicates that there is no return value yet since the system call is being executed, and 0 indicates that the system call has been executed normally. In addition, a value determined by the local file system 510 is stored. The type 3104 is a value indicating whether a target of the system call is a file or a directory. The Inode number is an Inode number of a file or the like serving as the target of the system call. The management information file handler 3106 is a value that uniquely identifies a file or the like serving as the target of the system call, and is a value that can be used to specify an operation target in a file or directory operation in the system call. The management information file handler 3106 does not change between generation and deletion of a file or a directory. The parent Inode number 3107 is an Inode number of an upper (parent) directory of a file or the like serving as the target of the system call. This is because it is necessary to identify the parent directory as a target of backup processing when a file or a directory is migrated or deleted by the system call. The execution state 3108 stores a value indicating an execution state of the system call. The time stamp 3109 is the time at which the system call has been called.

FIG. 9 is a view illustrating an example of the database 3200 of the file storage system 1 according to the embodiment.

The database 3200 has an Inode number 3201, a type 3202, a management information file handler 3203, presence/absence of Dirty section 3204, presence/absence of non-Stub section 3205, and a deletion flag 3206. Each row of the database 3200 is created for each of directories and files in the local file system 510.

The Inode number 3201 is an Inode number of a directory or a file. The type 3202 is a value indicating whether what is identified by the Inode number 3201 is a file or a directory. The management information file handler 3203 is a value that uniquely identifies a target file or the like. The presence/absence of Dirty section 3204 stores a value indicating whether there is a Dirty section even in a file stored in a directory or a part of the file itself. The presence/absence non-Stub section 3205 stores a value indicating whether there is a part that has been rewritten even in a part of data after the previous backup processing. The deletion flag 3206 stores a value indicating whether a file stored in a directory or the file itself has been deleted.

Next, an operation of the file storage system 1 of the present embodiment will be described with reference to flowcharts of FIGS. 10 to 21.

Figure 10:
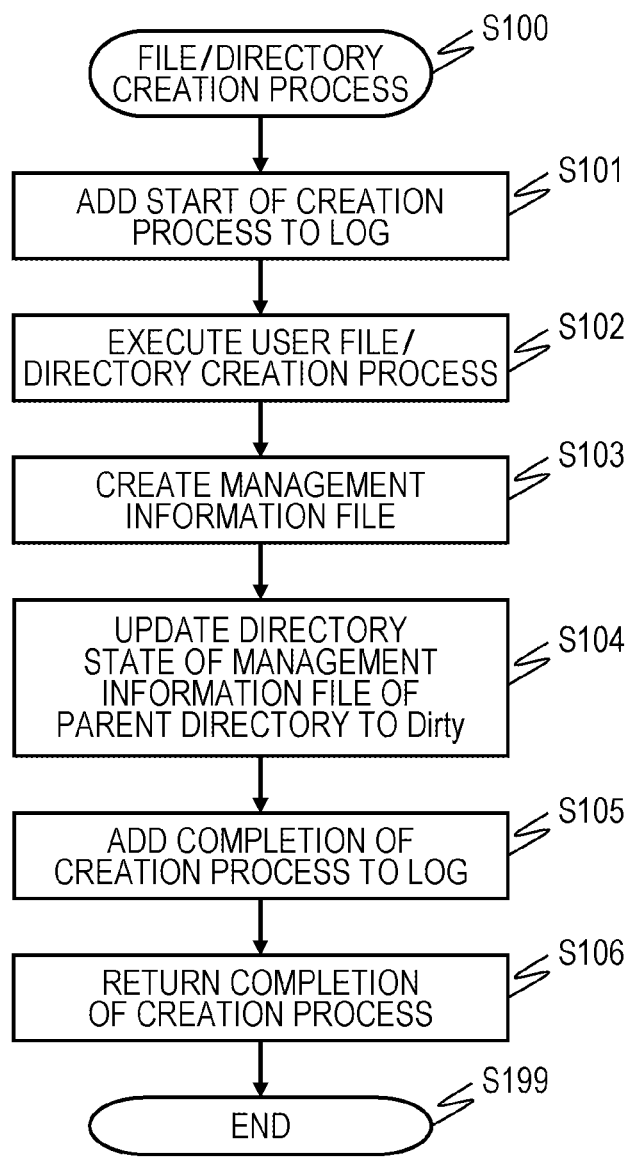
FIG. 10 is a flowchart for describing an example of a file/directory creation process of the file storage system according to the embodiment.

FIG. 10 is the flowchart for describing an example of a file/directory creation process of the file storage system 1 according to the embodiment.

When the file/directory creation process starts (Step S100), first, the IO Hook program 412 adds the start of the creation process to the log file 3100 (Step S101).

Next, the IO Hook program 412 executes a process of creating the user file 1200 and the directory 2200 based on a system call from the client 600 (Step S102). Next, the IO Hook program 412 creates the management information files 1100 and 2100 (Step S103). Next, the IO Hook program 412 updates the directory state 2112 of the management information file 2100 of the parent directory of a creation target file/directory to Dirty (Step S104).

Then, the IO Hook program 412 adds the completion of the creation process to the log file 3100 (Step S105), and returns the completion of the creation process to the network storage program 411 (Step S106).

Figure 11:
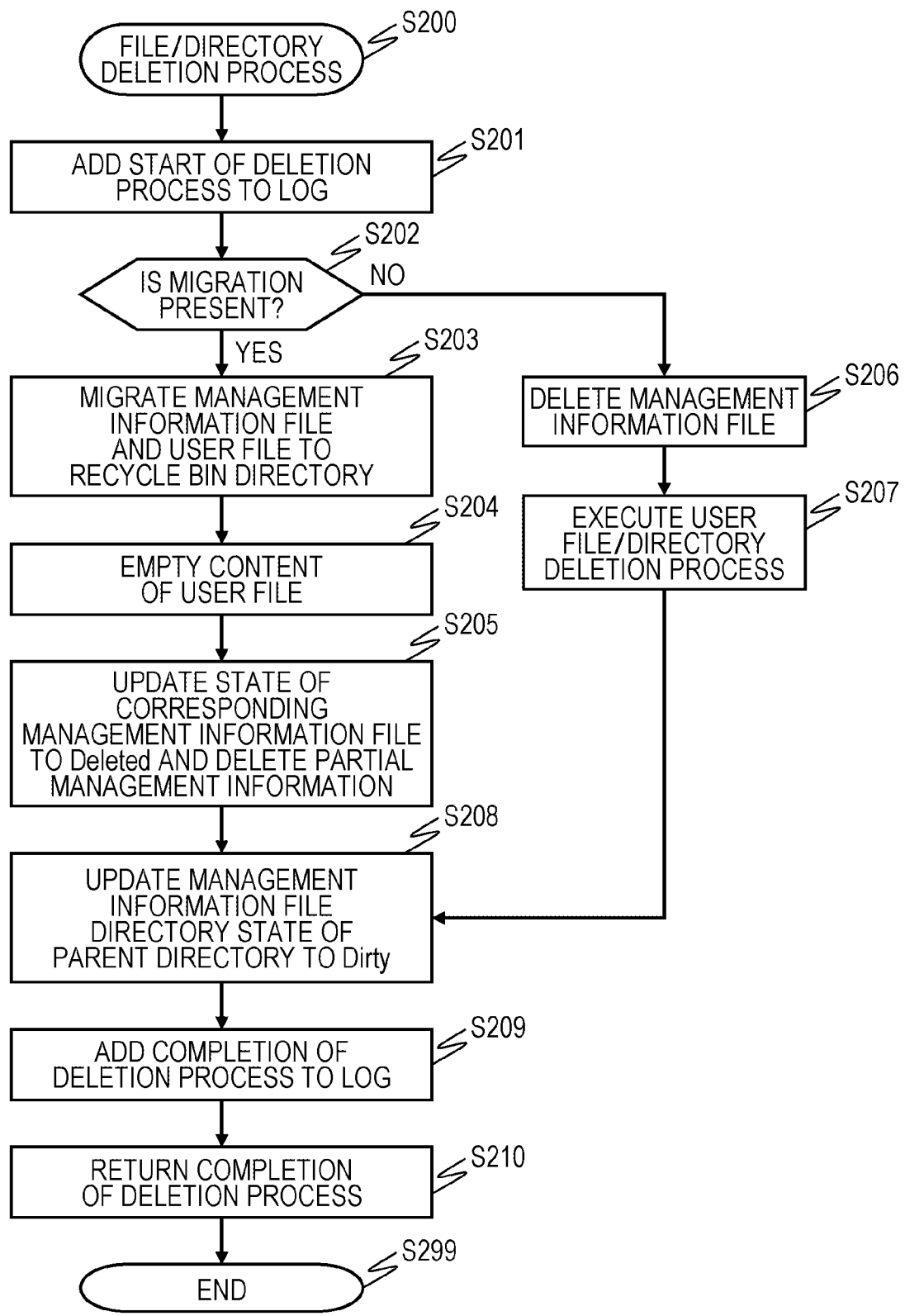
FIG. 11 is a flowchart for describing an example of a file/directory deletion process of the file storage system according to the embodiment.

FIG. 11 is the flowchart for describing an example of a file/directory deletion process of the file storage system 1 according to the embodiment.

When the file/directory deletion process starts (Step S200), first, the IO Hook program 412 adds the start of the deletion process to the log file 3100 (Step S201).

Next, the IO Hook program 412 determines whether migration is present in a deletion target file/directory (Step S202). The presence/absence of migration can be confirmed by the presence/absence of migration 1114 and 2114 of the management information files 1100 and 2100. If the determination is affirmative (YES in Step S202), the program proceeds to Step S203. If the determination is negative (NO in Step S202), the program proceeds to Step S206.

In Step S203, the IO Hook program 412 migrates the management information files 1100 and 2100 and the user file 1200 to a recycle bin directory, and then, the IO Hook program 412 empties the content of the user file 1200 (Step S204). Then, the IO Hook program 412 updates the file state 1112 and the directory state 2112 of the corresponding management information files 1100 and 2100 to Deleted and deletes the partial management information 1120 (Step S205).

On the other hand, in Step S206, the IO Hook program 412 deletes the management information files 1100 and 2100, and then, executes a process of deleting the user file 1200 and the user directory 2200 (Step S207).

Next, the IO Hook program 412 updates the directory state 2112 of the management information file 2100 of the parent directory of a creation target file/directory to Dirty (Step S208). Then, the IO Hook program 412 adds the completion of the deletion process to the log file 3100 (Step S209), and returns the completion of the deletion process to the network storage program 411 (Step S210).

Figure 12:
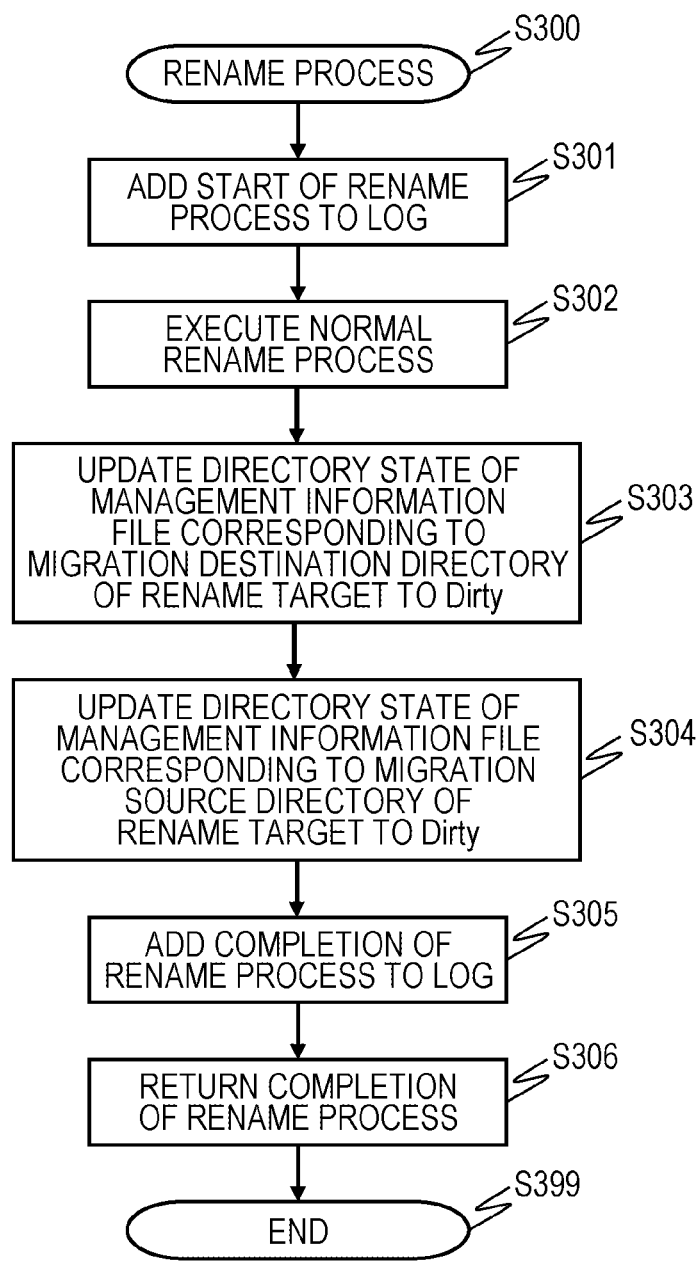
FIG. 12 is a flowchart for describing an example of a rename process of the file storage system according to the embodiment.

FIG. 12 is the flowchart for describing an example of a rename process of the file storage system 1 according to the embodiment.

When the rename process starts (Step S300), first, the IO Hook program 412 adds the start of the rename process to the log file 3100 (Step S301).

Next, the IO Hook program 412 executes a normal rename process (Step S302). Next, the IO Hook program 412 updates the directory state 2112 of the management information file 2100 corresponding to a migration destination directory as a rename target to Dirty (Step S303). Further, the IO Hook program 412 updates the directory state 2112 of the management information file 2100 corresponding to a migration source directory as a rename target to Dirty (Step S304).

Then, the IO Hook program 412 adds the completion of the rename process to the log file 3100 (Step S305), and returns the completion of the rename process to the network storage program 411 (Step S306).

Figure 13:
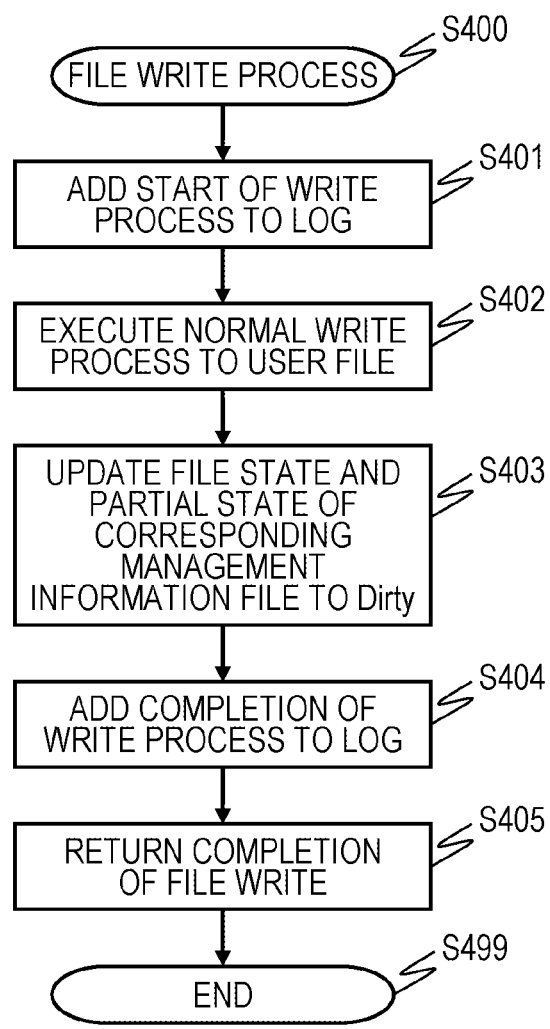
FIG. 13 is a flowchart for describing an example of a file write process of the file storage system according to the embodiment.

FIG. 13 is the flowchart for describing an example of a file write process of the file storage system 1 according to the embodiment.

When the file write process starts (Step S400), first, the IO Hook program 412 adds the start of the write process to the log file 3100 (Step S401).

Next, the IO Hook program 412 performs a normal write process on the user file 1200 (Step S402). Next, the IO Hook program 412 updates the file state 1112 of the corresponding management information file 1100 to Dirty (Step S403).

Then, the IO Hook program 412 adds the completion of the write process to the log file 3100 (Step S404), and returns the completion of the write process to the network storage program 411 (Step S405).

Figure 14:
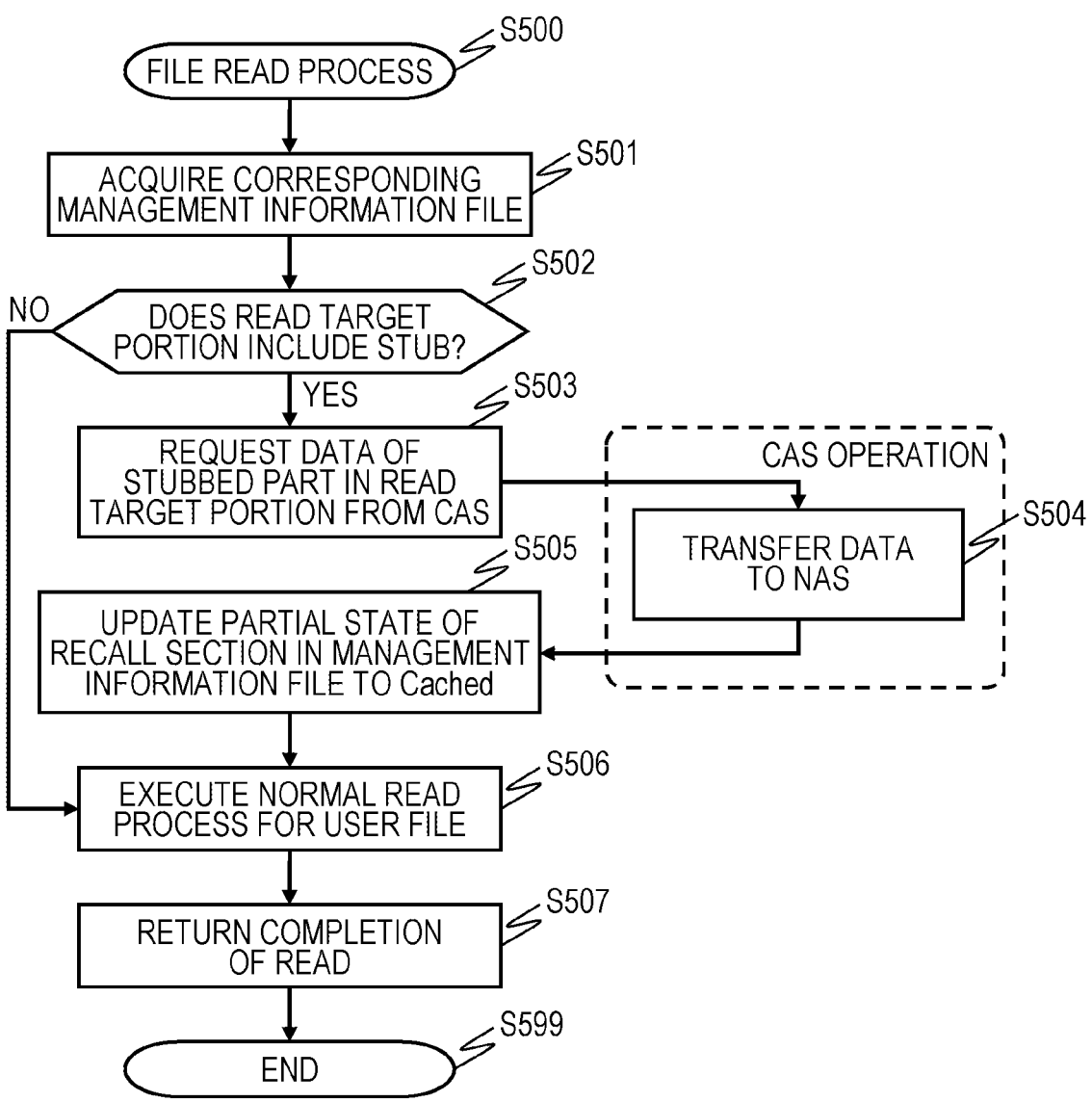
FIG. 14 is a flowchart for describing an example of a file read process of the file storage system according to the embodiment.

FIG. 14 is the flowchart for describing an example of a file read process of the file storage system 1 according to the embodiment.

When the file read process starts (Step S500), first, the IO Hook program 412 acquires the corresponding management information file 1100 (Step S501).

Next, the IO Hook program 412 determines whether a read target portion includes a stubbed part (Step S502). If the determination is affirmative (YES in Step S502), the program proceeds to Step S503. If the determination is negative (NO in Step S502), the program proceeds to Step S506.

In Step S503, the IO Hook program 412 requests data of the stubbed part in the read target portion from the CAS 200. The file virtualization program 423 of the CAS 200 transfers the data to the NAS 100 based on the request from the IO Hook program 412 (Step S504).

Next, the IO Hook program 412 updates the partial state 1123 of a recall section in the management information file 1100, that is, the data transferred from the CAS 200, to Cached (Step S505).

Then, the IO Hook program 412 performs a normal read process on the user file 1200 (Step S506), and returns the completion of the read process to the network storage program 411 (Step S507).

Figure 15:
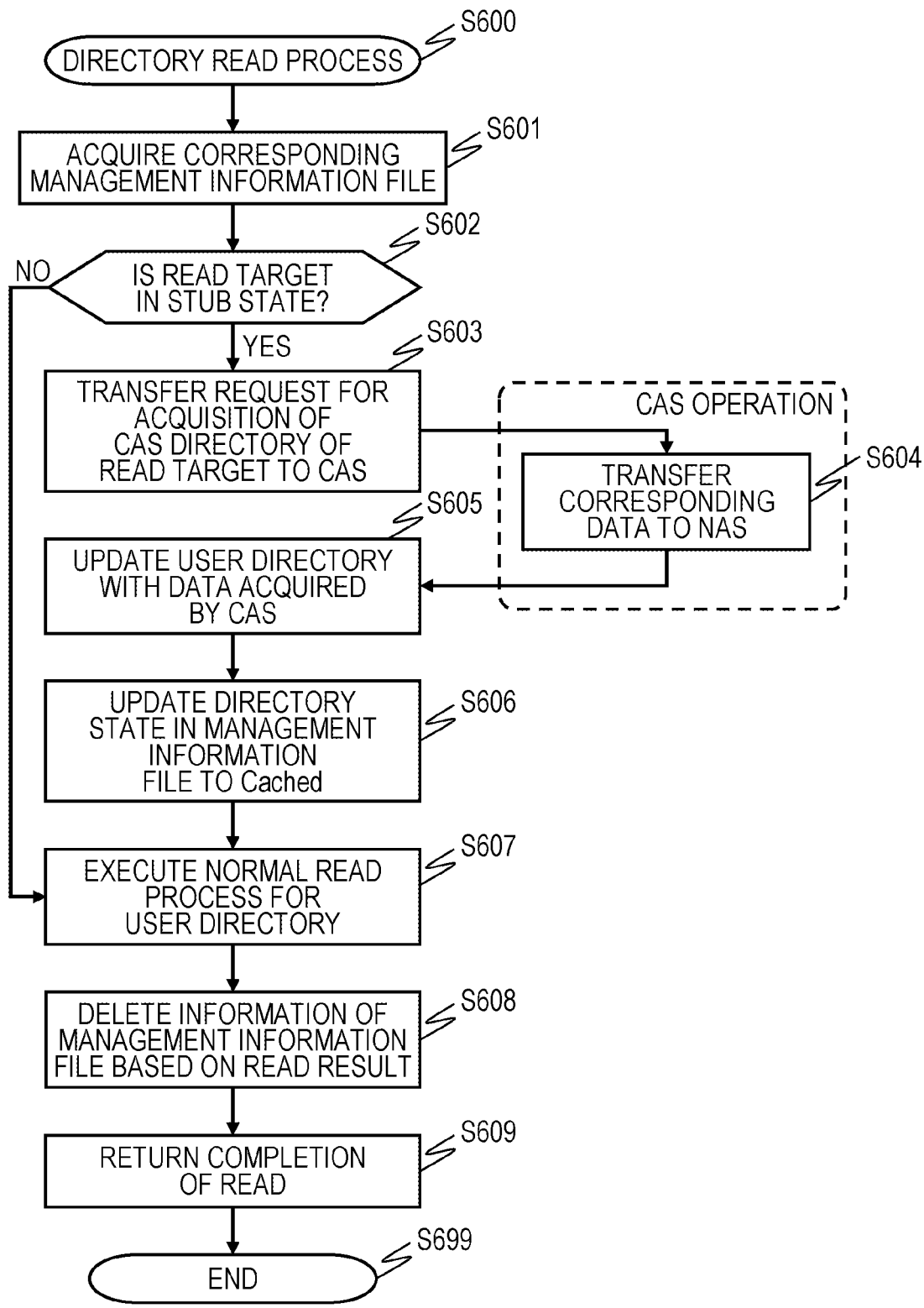
FIG. 15 is a flowchart for describing an example of a directory read process of the file storage system according to the embodiment.

FIG. 15 is the flowchart for describing an example of a directory read process of the file storage system 1 according to the embodiment.

When the directory read process starts (Step S600), first, the IO Hook program 412 acquires the corresponding management information file 2100 (Step S601).

Next, the IO Hook program 412 determines whether a read target directory is in a stub state (Step S602). If the determination is affirmative (YES in Step S602), the program proceeds to Step S603. If the determination is negative (NO in Step S602), the program proceeds to Step S607.

In Step S603, the IO Hook program 412 transfers an acquisition request for the CAS directory 2300 of the read target to the CAS 200. The file virtualization program 423 of the CAS 200 transfers the data to the NAS 100 based on the request from the IO Hook program 412 (Step S604).

Next, the IO Hook program 412 updates the user directory 2200 with the data acquired from the CAS 200 (Step S605), and updates the directory state 2112 of the management information file 2100 to Cached (Step S606).

Then, the IO Hook program 412 performs a normal read process on the user directory 2200 (Step S607), deletes information in the management information file 2100 from the read result such that the management information file 2100 is invisible from the client 600 (Step S608), and returns the completion of the read processing to the network storage program 411 (Step S609).

Figure 16:
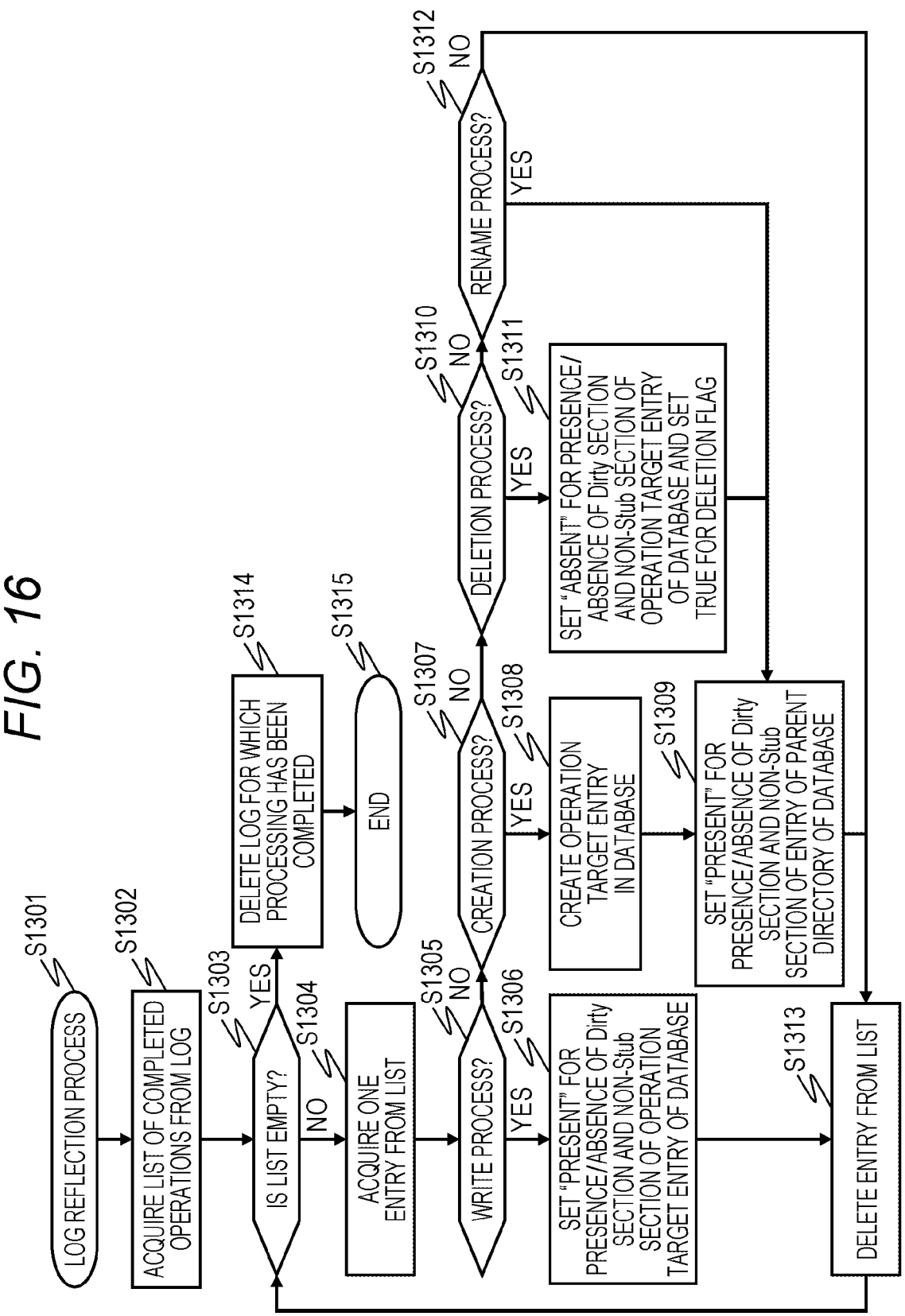
FIG. 16 is a flowchart for describing an example of a log reflection process of the file storage system according to the embodiment.

FIG. 16 is the flowchart for describing an example of a log reflection process of the file storage system 1 according to the embodiment.

When the log reflection process starts (Step S1301), the file virtualization program 415 refers to the execution state 3108 of the log file 3100 to acquire a list of completed operations from the log file 3100 (Step S1302).

Next, the file virtualization program 415 determines whether the list acquired in Step S1302 is empty (Step S1303). As a result, the program proceeds to Step S1314 if the determination is affirmative (YES in Step S1303), and the program proceeds to Step S1304 if the determination is negative (NO in Step S1303).

In Step S1304, the file virtualization program 415 acquires one entry from the list acquired in Step S1302. Next, the file virtualization program 415 determines whether the entry acquired in Step S1304 is a write process (Step S1305). If the determination is affirmative (YES in Step S1305), the program proceeds to Step S1306. If the determination is negative (NO in Step S1305), the program proceeds to Step S1307.

In Step S1306, the file virtualization program 415 sets the presence/absence of Dirty section 3204 and the presence/absence of non-Stub section 3205 of an operation target entry of the database 3200 to "present".

In Step S1307, the file virtualization program 415 determines whether the entry acquired in Step S1304 is a creation process. If the determination is affirmative (YES in Step S1307), the program proceeds to Step S1308. If the determination is negative (NO in Step S1307), the program proceeds to Step S1310.

In Step S1308, the file virtualization program 415 creates an operation target entry of the database 3200, sets the presence/absence of Dirty section 3204 and the presence/absence of non-Stub section 3205 of the created entry to "present", and sets a value of the deletion flag 3206 to False. Further, the file virtualization program 415 sets the presence/absence of Dirty section 3204 and the presence/absence of non-Stub section 3205 of an entry of an operation target parent directory of the database 3200 to "present" (Step S1309).

In Step S1310, the file virtualization program 415 determines whether the entry acquired in Step S1304 is a deletion process. If the determination is affirmative (YES in Step S1310), the program proceeds to Step S1311. If the determination is negative (NO in Step S1310), the program proceeds to Step S1312.

In Step S1311, the file virtualization program 415 sets the presence/absence of Dirty section 3204 and the presence/absence of non-Stub section 3205 of the operation target entry of the database 3200 to "absent", and sets the deletion flag 3206 to True.

In Step S1312, the file virtualization program 415 determines whether the entry acquired in Step S1304 is a rename process. If the determination is affirmative (YES in Step S1312), the program proceeds to Step S1309. If the determination is negative (NO in Step S1312), the program proceeds to Step S1313.

In Step S1313, the file virtualization program 415 deletes the entry from the list acquired in Step S1302.

On the other hand, the file virtualization program 415 deletes a log for which processing has been completed in Step S1314.

Figure 17:
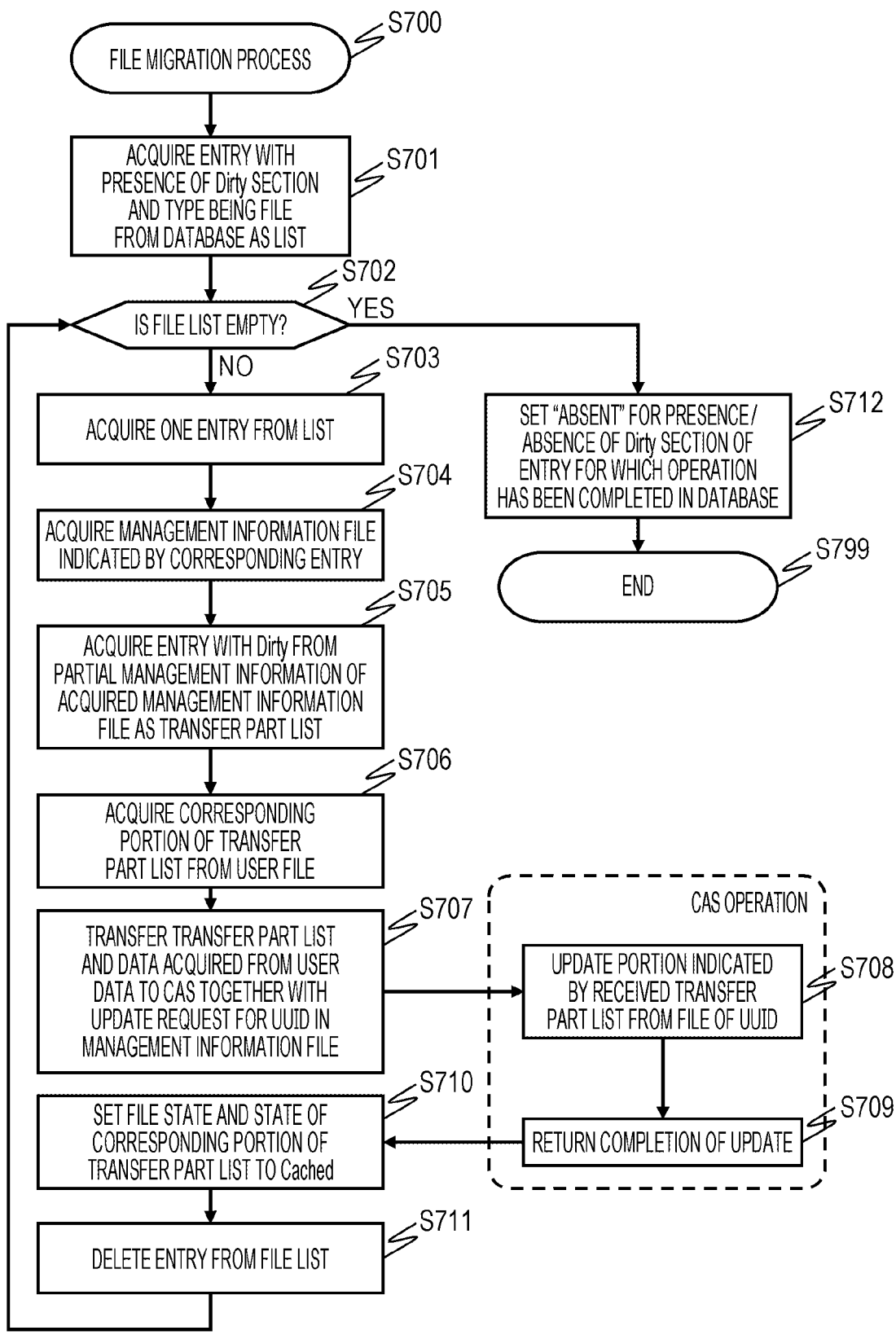
FIG. 17 is a flowchart for describing an example of a file migration process of the file storage system according to the embodiment.

FIG. 17 is the flowchart for describing an example of a file migration process of the file storage system according to the embodiment.

When the file migration process starts (Step S700), the file virtualization program 415 acquires, from the database 3200, an entry with the presence/absence of Dirty section 3204 being present and the type 3202 being file as a list (Step S701).

Next, the file virtualization program 415 determines whether the file list acquired in Step S701 is empty (Step S702). As a result, the program proceeds to Step S712 if the determination is affirmative (YES in Step S702), and the program proceeds to Step S703 if the determination is negative (NO in Step S702).

In Step S703, the file virtualization program 415 acquires one entry from the list acquired in Step S701. Next, the file virtualization program 415 acquires the management information file 1100 indicated by the entry acquired in Step S703 (Step S704). Next, the file virtualization program 415 acquires the entry with Dirty as a transfer part list from the partial management information 1120 of the management information file 1100 acquired in Step S704 (Step S705), and acquires the corresponding portion of the acquired transfer part list from the user file 1200 (Step S706).

Next, the file virtualization program 415 transfers the transfer part list acquired in Step S705 and the data from the user file 1200 acquired in Step S706 to the CAS 200 along with an update request with respect to the UUID 1111 in the management information file 1100 (Step S707).

The file virtualization program 423 of the CAS 200 updates the portion indicated by the transfer part list received in Step S707 in the user file 1200 in the CAS 200 identified by the UUID (Step S708), and returns the update completion to the NAS 100 (Step S709).

Then, the file virtualization program 415 sets the file state 1112 of the management information file 1100 and the partial state 1123 of the corresponding portion of the transfer part list to Cached (Step S710), and deletes the entry from the file list acquired in Step S701 (Step S711).

On the other hand, the file virtualization program 415 sets "Absent" for the presence/absence of Dirty section 3204 of the entry for which the operation has been completed in the database 3200 in Step S712.

Figure 18:
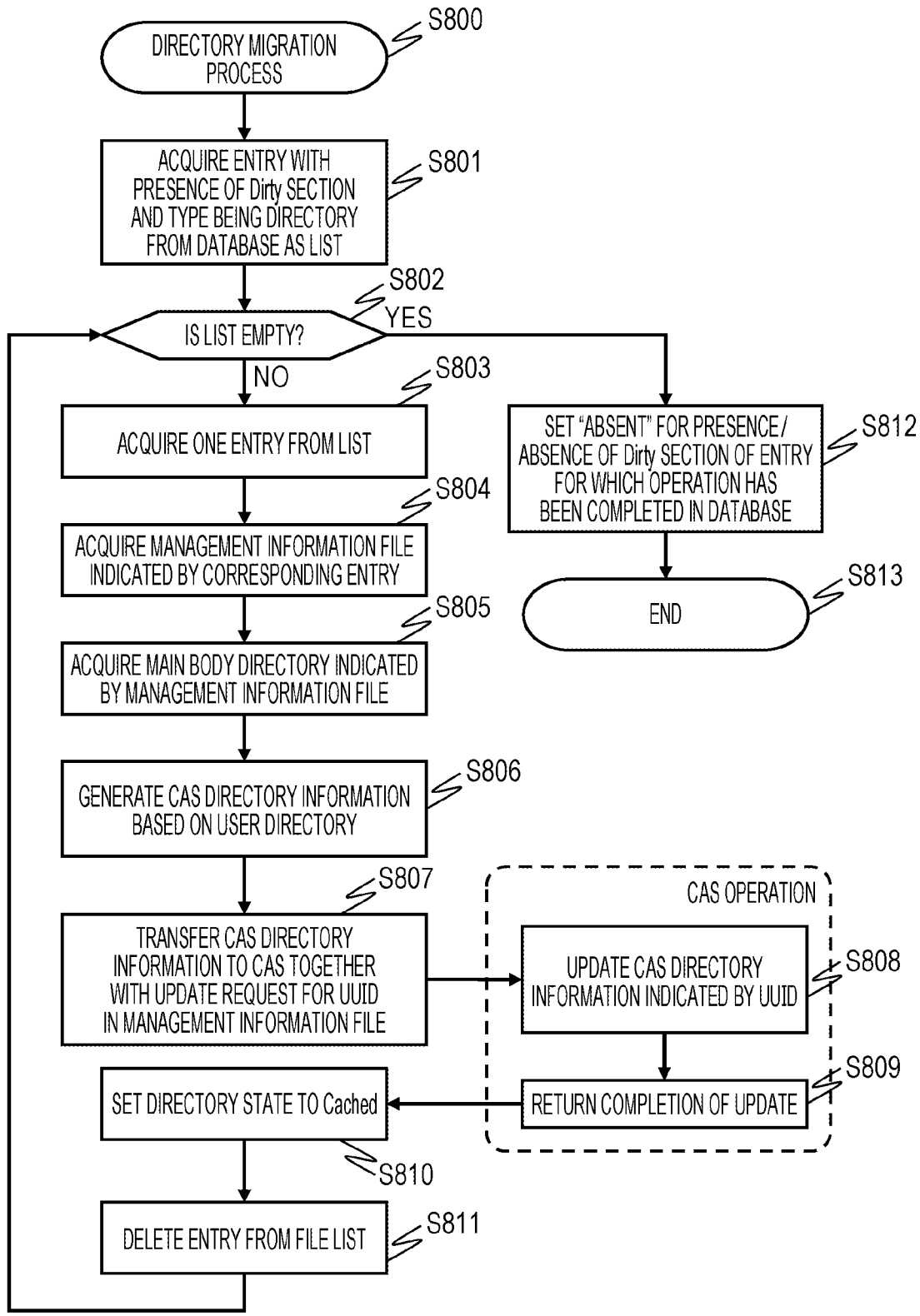
FIG. 18 is a flowchart for describing an example of a directory migration process of the file storage system according to the embodiment.

FIG. 18 is the flowchart for describing an example of a directory migration process of the file storage system 1 according to the embodiment.

When the directory migration process starts (Step S800), the file virtualization program 415 acquires, from the database 3200, an entry with the presence/absence of Dirty section 3204 being present and the type 3202 being directory as a list (Step S801).

Next, the file virtualization program 415 determines whether the file list acquired in Step S801 is empty (Step S802). As a result, the program proceeds to Step S812 if the determination is affirmative (YES in Step S802), and the program proceeds to Step S803 if the determination is negative (NO in Step S802).

In Step S803, the file virtualization program 415 acquires one entry from the list acquired in Step S801. Next, the file virtualization program 415 acquires the management information file 2100 indicated by the entry acquired in Step S803 (Step S804). Next, the file virtualization program 415 acquires the user directory 2200 indicated by the management information file 2100 acquired in Step S804 (Step S805), and generates information on the CAS directory 2300 based on the acquired user directory 2200 (Step S806).

Next, the file virtualization program 415 transfers the information on the CAS directory 2300 generated in Step S806 to the CAS 200 along with an update request with respect to the UUID 2111 in the management information file 2100 (Step S807).

The file virtualization program 423 of the CAS 200 updates the CAS directory 2300 in the CAS 200 identified by the UUID (Step S808), and returns the update completion to the NAS 100 (Step S809).

Then, the file virtualization program 415 sets the directory state 2112 of the management information file 2100 to Cached (Step S810), and deletes the entry from the file list acquired in Step S801 (Step S811).

On the other hand, the file virtualization program 415 sets "Absent" for the presence/absence of Dirty section 3204 of the entry for which the operation has been completed in the database 3200 in Step S812.

Figure 19:
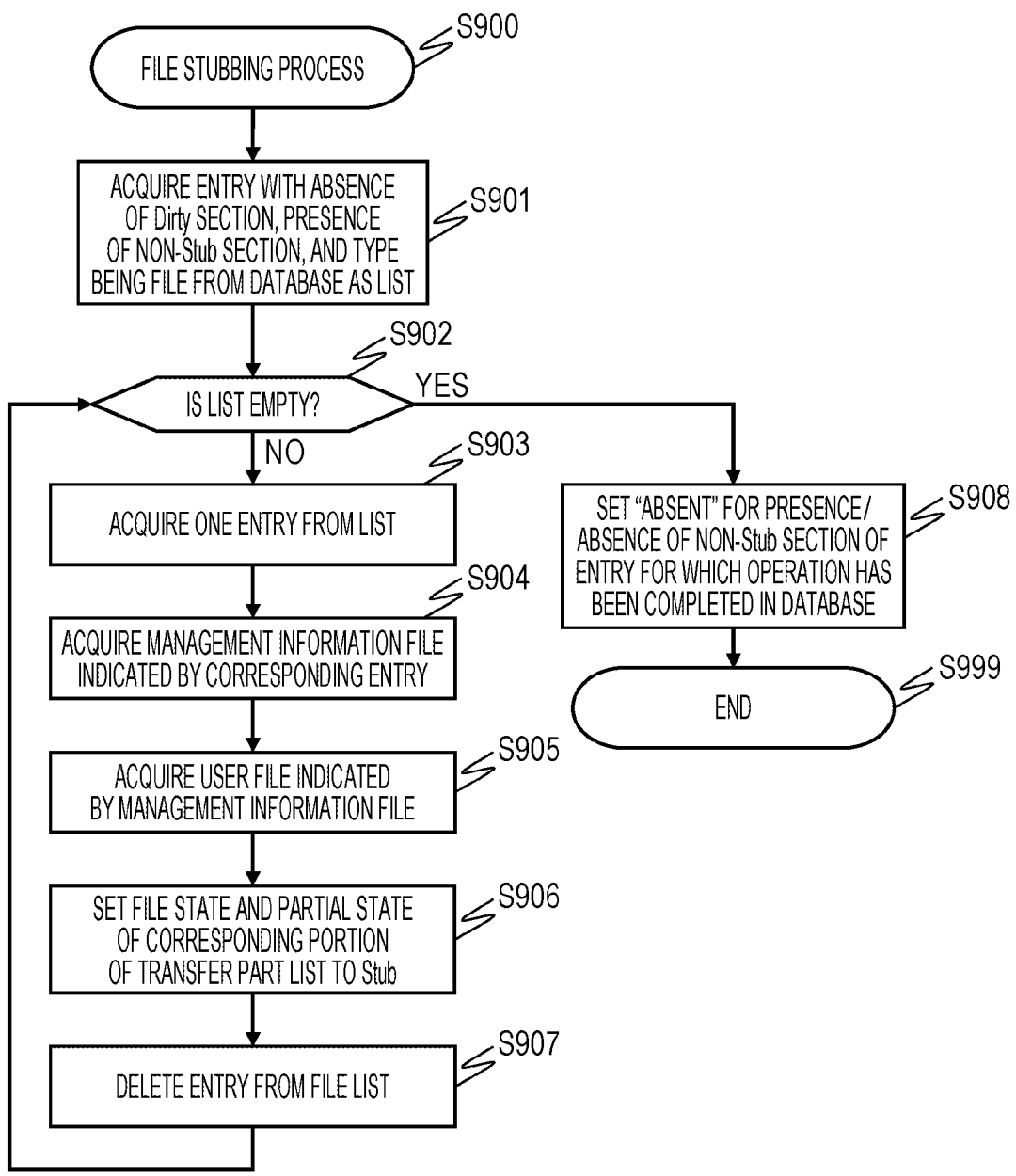
FIG. 19 is a flowchart for describing an example of a file stubbing process of the file storage system according to the embodiment.

FIG. 19 is the flowchart for describing an example of a file stubbing process of the file storage system 1 according to the embodiment.

When the file stubbing process starts (Step S900), the file virtualization program 415 acquires, from the database 3200, an entry with the presence/absence of Dirty section 3204 being absent and the type 3202 being file as a list (Step S901).

Next, the file virtualization program 415 determines whether the file list acquired in Step S901 is empty (Step S902). As a result, the program proceeds to Step S908 if the determination is affirmative (YES in Step S902), and the program proceeds to Step S903 if the determination is negative (NO in Step S902).

In Step S703, the file virtualization program 415 acquires one entry from the list acquired in Step S901. Next, the file virtualization program 415 acquires the management information file 1100 indicated by the entry acquired in Step S703 (Step S904). Next, the file virtualization program 415 acquires the user file 1200 indicated by the management information file 1100 acquired in Step S904 (Step S905).

Then, the file virtualization program 415 sets the file state 1112 of the management information file 1100 and the partial state 1123 of the corresponding portion of the transfer part list to Stub (Step S906), and deletes the entry from the file list acquired in Step S901 (Step S907).

On the other hand, the file virtualization program 415 sets "Absent" for the presence/absence of non-Stub section 3205 of the entry for which the operation has been completed in the database 3200 in Step S908.

Figure 20:
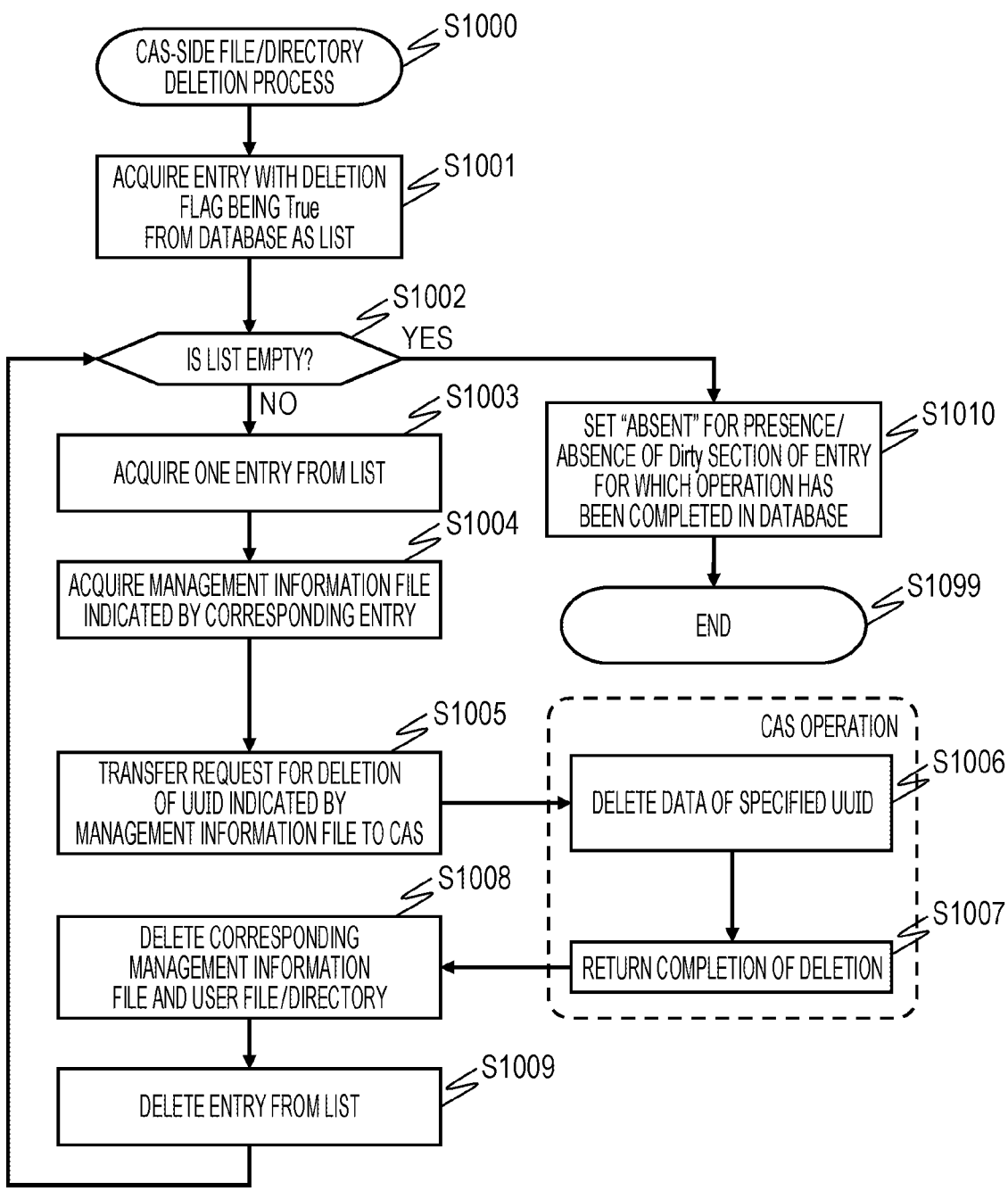
FIG. 20 is a flowchart for describing an example of a CAS-side file/directory deletion process of the file storage system according to the embodiment.

FIG. 20 is the flowchart for describing an example of a CAS-side file/directory deletion process of the file storage system 1 according to the embodiment.

When the CAS-side file/directory deletion process is started (Step S1000), the file virtualization program 415 acquires, from the database 3200, an entry with the deletion flag 3206 being True as a list (Step S1001).

Next, the file virtualization program 415 determines whether the file list acquired in Step S1001 is empty (Step S1002). As a result, the program proceeds to Step S1010 if the determination is affirmative (YES in Step S1002), and the program proceeds to Step S1003 if the determination is negative (NO in Step S1002).

In Step S1003, the file virtualization program 415 acquires one entry from the list acquired in Step S1001. Next, the file virtualization program 415 acquires the management information files 1100 and 2100 indicated by the entry acquired in Step S1003 (Step S1004).

Next, the file virtualization program 415 transfers a deletion request for the UUIDs 1111 and 2111 indicated by the management information files 1100 and 2100 to the CAS 200 (Step S1005).

The file virtualization program 423 of the CAS 200 deletes the user file 1200 and the user directory 2200 in the CAS 200 identified by the UUID (Step S1006), and returns the deletion completion to the NAS 100 (Step S1007).

Then, the file virtualization program 415 deletes the entry from the list acquired in Step S1001 (Step S1009).

On the other hand, the file virtualization program 415 sets "Absent" for the presence/absence of Dirty section 3204 of the entry for which the operation has been completed in the database 3200 in Step S1010.

Figure 21:
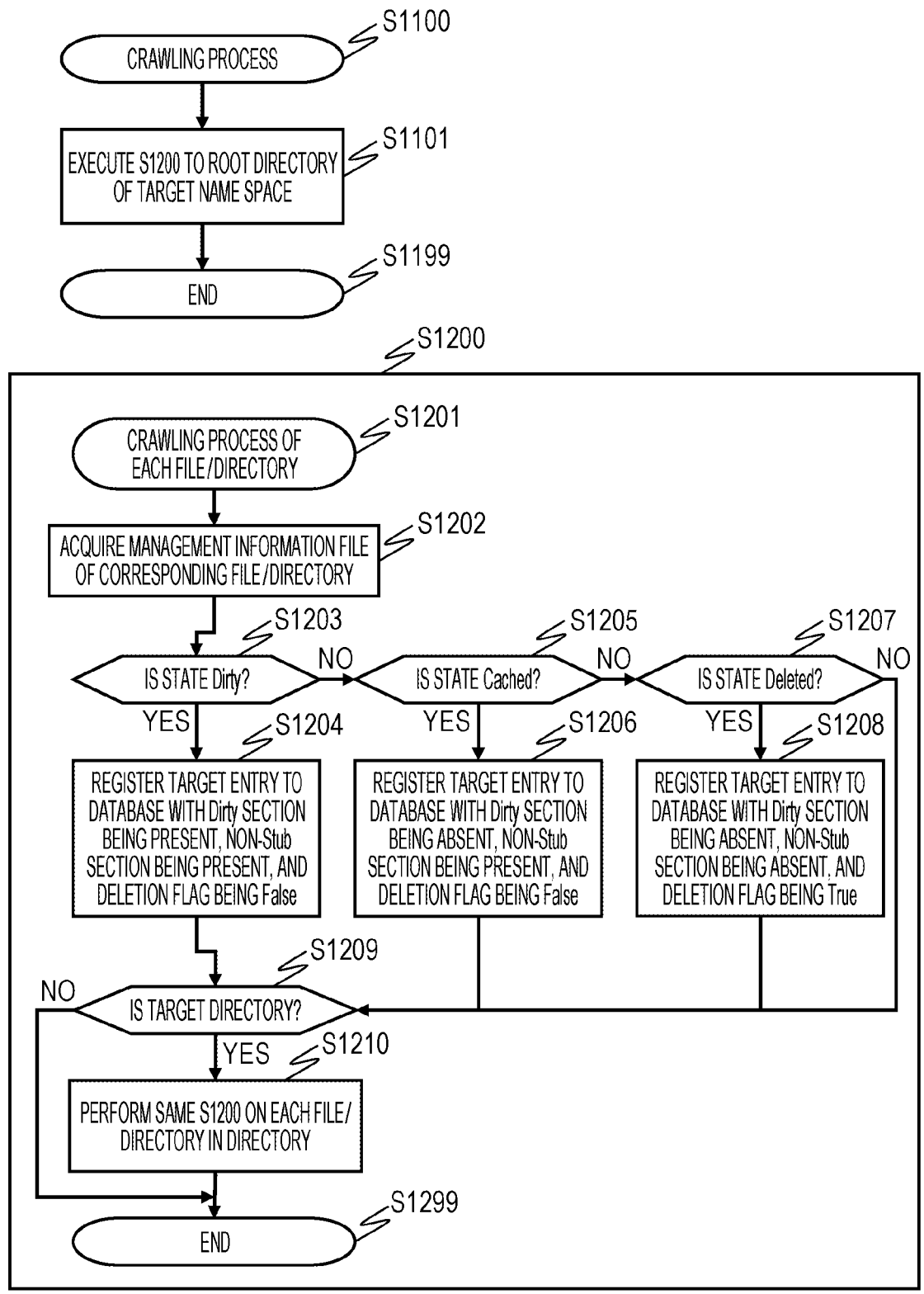
FIG. 21 is a flowchart for describing an example of a crawling process of the file storage system according to the embodiment.

FIG. 21 is the flowchart for describing an example of a crawling process of the file storage system 1 according to the embodiment.

When the crawling process starts (Step S1100), the file virtualization program 415 executes processing in Step S1200 to be described below on the user file 1200 and the root directory 2200 of the user directory 2200 serving as file virtualization targets.

In Step S1200, the file virtualization program 415 first acquires the management information files 1100 and 2100 of the corresponding user file 1200 and user directory 2200 (Step S1202).

Next, the file virtualization program 415 determines whether the file state 1112 and the directory state 2112 of the management information files 1100 and 2100 acquired in Step S1202 are Dirty (Step S1203). If the determination is affirmative (YES in Step S1203), the program proceeds to Step S1204. If the determination is negative (NO in Step S1203), the program proceeds to Step S1205.

In Step S1204, the target entry is registered in the database 3200 such that the presence/absence of Dirty section 3204 is present, the presence/absence of non-Stub section 3205 is present, and the deletion flag 3206 is False.

In Step S1205, the file virtualization program 415 determines whether the file state 1112 and the directory state 2112 of the management information files 1100 and 2100 acquired in Step S1202 are Cached. If the determination is affirmative (YES in Step S1205), the program proceeds to Step S1206. If the determination is negative (NO in Step S1205), the program proceeds to Step S1207.

In Step S1206, the target entry is registered in the database 3200 such that the presence/absence of Dirty section 3204 is absent, the presence/absence of non-Stub section 3205 is present, and the deletion flag 3206 is False.

In Step S1207, the file virtualization program 415 determines whether the file state 1112 and the directory state 2112 of the management information files 1100 and 2100 acquired in Step S1202 are Deleted. If the determination is affirmative (YES in Step S1207), the program proceeds to Step S1208. If the determination is negative (NO in Step S1207), the program proceeds to Step S1209.

In Step S1208, the target entry is registered in the database 3200 such that the presence/absence of Dirty section 3204 is absent, the presence/absence of non-Stub section 3205 is absent, and the deletion flag 3206 is True.

In Step S1209, the file virtualization program 415 determines whether a target of a crawling process is a directory. If the determination is affirmative (YES in Step S1209), the program proceeds to Step S1210. If the determination is negative (NO in Step S1209), the program is ended.

In Step S1210, the processing in Step S1200 is executed for each file/directory in the directory.

According to the present embodiment configured in this manner, the NAS 100 of the file storage system 1 performs interruption between the file operation request from the client 600 and the file system calling process, and adds the update process of the management information files 1100 and 2100, which are the state management information of the files, based on the input information with respect to the file system or operation content.

Therefore, it is possible to provide a file virtualization function without being affected by a version upgrade of the file system according to the present embodiment.

In addition, the NAS 100 registers information necessary for accessing the file, which has not changed during a period between the generation and deletion of the file, in the log file 3100. As a result, a process of tracing a path change of each file is not required as compared with a method of registering a path changing between creation and deletion of a file as information for which access is necessary. Thus, it is possible to suppress an increase in load of analyzing the log file 3100 during the migration process or the stubbing process which is a file virtualization process.

Incidentally, the configuration has been described in detail in the above embodiment in order to describe the invention in an easily understandable manner, and is not necessarily limited to one including the entire configuration that has been described above. Further, addition, deletion, or substitution of other configurations can be made with respect to some configurations of each embodiment.

A part or all of each of the above-described configurations, functions, processing units, processing means, and the like may be realized, for example, by hardware by designing with an integrated circuit and the like. The invention can also be realized by a program code of software for realizing the functions of the embodiment. In this case, a storage medium in which the program code has been recorded is provided to a computer, and a processor included in the computer reads the program code stored in the storage medium. In this case, the program code itself read from the storage medium realizes the functions of the above embodiment, and the program code itself and the storage medium storing the program code constitute the invention. As the storage medium configured to supply such a program code, for example, a flexible disk, a CD-ROM, a DVD-ROM, a hard disk, a solid state drive (SSD), an optical disk, a magneto-optical disk, CD-R, a magnetic tape, a nonvolatile memory card, a ROM, or the like is used.

The program code for realizing the functions described in the present embodiments can be implemented by a wide range of programs or script languages such as assembler, C/C++, perl, Shell, PHP, and Java (registered trademark).

In the above embodiment, control lines and information lines are considered to be necessary for the description have been illustrated, and it is difficult to say that all of the control lines and information lines required as a product are illustrated. All the configurations may be connected to each other.

The invention claimed is:

1. A storage system configured to use a second storage system, the storage system comprising:
    a first storage system storing a data;
    a processor;
    state management information storing a state of the data;
    a state information management unit that manages the state management information; and
    a data virtualization unit that manages data stored in the first storage system and the second storage system,
    wherein the processor processes an operation request of the data based on an operation request of the data from an application,
    wherein the state information management unit performs a state management information update process of the data based on an operation content related to the operation request,
    wherein the data virtualization unit performs a management process of the data between the first storage system and the second storage system based on the state management information,
    wherein the state information management unit creates a log of the operation request in addition to update of the state management information,
    wherein the data virtualization unit performs the management process of the data based on the log of the operation request,
    wherein the storage system includes a user directory which the first storage system manages,
    wherein the state management information, which the state information management unit manages, is associated with the user directory, stores a data state of the first storage system for the data having a same identifier stored in the second storage system, and a different identifier that is different from the same identifier, and
    wherein the data virtualization unit performs the management process of the data that reflects an operation, based on the operation content, on the first storage system to the file having the same identifier of the second storage system based on the data state of the first storage system and the different identifier in the state management information.

2. The storage system according to claim 1, wherein the management process of the data is migration of the data between the first storage system and the second storage system.

3. The storage system according to claim 2, wherein the first storage system has a hierarchical structure, and the second system does not have a hierarchical structure, and
    wherein the data virtualization unit performs the management process of the data between the first storage system and the second system.

4. The storage system according to claim 1, wherein a directory name and a data name of a hierarchical structure are changeable, and
    wherein the data is identified by the different identifier in the state management information.

5. The storage system according to claim 1, wherein the data virtualization unit performs a crawling process of the data using the log of the operation request to update the state management information when the first storage system recovers from abnormal termination.

6. The storage system according to claim 1, further comprising:
   a first computer system having the first storage system, the processor, the state information management unit, the state management information, and the data virtualization unit; and
   a second computer system that has the second storage system and performs backup of a file to be stored in the first computer system.

7. The storage system according to claim 6, wherein a directory name and a data name of a hierarchical structure are changeable, and
   wherein, when the data is backed up to the second computer system, the state information management unit manages the data with a different identifier.

8. The storage system according to claim 1, wherein the state information management unit manages a state for each part of the data in the state management information.

9. The storage system according to claim 1, wherein the data is identified by a different identifier, and
   wherein the different identifier does not change between generation and deletion of the data in the log.

10. The storage system according to claim 1, wherein the first storage system manages the data of the first storage system with a hierarchical structure having a directory name and a data name,
   wherein the first storage system and the second storage system store the data having a same identifier,
   wherein
      in the user directory the directory name and the data name of the data are described, wherein the data is changeable,
   wherein the data virtualization unit manages data stored in the first storage system and the second storage system,
   wherein the first storage system processes the operation request of the data to operate the data stored in the first storage system, and
   wherein the state management information update process updates a state with respect to the data of the second storage system that has the same identifier as the data of the first storage system through an operation based on the operation content with respect to the first storage system related to the operation request.

* * * * *